United States Patent
Viano et al.

(10) Patent No.: US 12,440,923 B2
(45) Date of Patent: Oct. 14, 2025

(54) METHOD OF JOINING AND SEALING A VANADIUM BASED MEMBRANE TO A METALLIC CONNECTION SECTION

(71) Applicant: Commonwealth Scientific and Industrial Research Organisation, Acton (AU)

(72) Inventors: David Michael Viano, Kenmore (AU); Michael David Dolan, Woodend (AU)

(73) Assignee: COMMONWEALTH SCIENTIFIC AND INDUSTRIAL RESEARCH ORGANISATION, Acton (AU)

(*) Notice: Subject to any disclaimer, the term of this patent is extended or adjusted under 35 U.S.C. 154(b) by 603 days.

(21) Appl. No.: 16/624,761

(22) PCT Filed: Jun. 25, 2018

(86) PCT No.: PCT/AU2018/050636
§ 371 (c)(1),
(2) Date: Dec. 19, 2019

(87) PCT Pub. No.: WO2019/000026
PCT Pub. Date: Jan. 3, 2019

(65) Prior Publication Data
US 2021/0138584 A1 May 13, 2021

(30) Foreign Application Priority Data
Jun. 30, 2017 (AU) .................. 2017902556

(51) Int. Cl.
*B23K 26/20* (2014.01)
*B01D 63/06* (2006.01)
(Continued)

(52) U.S. Cl.
CPC .......... *B23K 26/206* (2013.01); *B01D 65/003* (2013.01); *B01D 69/02* (2013.01);
(Continued)

(58) Field of Classification Search
CPC .. B23K 26/206; B23K 26/703; B23K 1/0056; B23K 1/19; B23K 26/1464;
(Continued)

(56) References Cited

U.S. PATENT DOCUMENTS 4,032,243 A * 6/1977 Keifert ...................... F16B 5/08
403/272
5,259,870 A * 11/1993 Edlund ...................... C01B 3/12
95/56
(Continued)

FOREIGN PATENT DOCUMENTS

AT 12132 U1 * 9/2011 ............. B01D 53/22
CN 1692529 A 11/2005
(Continued)

OTHER PUBLICATIONS

Machine English Translation of JP-4270014-B2 (Year: 2009).*
(Continued)

*Primary Examiner* — Ibrahime A Abraham
*Assistant Examiner* — Erwin J Wunderlich
(74) *Attorney, Agent, or Firm* — Merchant & Gould P.C.

(57) ABSTRACT

The present invention generally relates to a method of joining and sealing a vanadium based membrane to a metallic connection section. The invention is particularly applicable to joining a tubular vanadium or vanadium alloy membrane to a stainless steel body and it will be convenient to hereinafter disclose the invention in relation to that exemplary application. The present disclosure also includes methods of joining and sealing a vanadium based membrane to a metallic connection section.

12 Claims, 13 Drawing Sheets

(51) Int. Cl.
| | |
|---|---|
| *B01D 65/00* | (2006.01) |
| *B01D 69/02* | (2006.01) |
| *B01D 69/04* | (2006.01) |
| *B01D 71/02* | (2006.01) |
| *B23K 1/005* | (2006.01) |
| *B23K 1/19* | (2006.01) |
| *B23K 26/14* | (2014.01) |
| *B23K 26/70* | (2014.01) |
| *C01B 3/50* | (2006.01) |
| *B23K 101/06* | (2006.01) |
| *B23K 103/04* | (2006.01) |
| *B23K 103/08* | (2006.01) |

(52) U.S. Cl.
CPC ......... *B01D 69/04* (2013.01); *B01D 71/0221* (2022.08); *B23K 1/0056* (2013.01); *B23K 1/19* (2013.01); *B23K 26/1464* (2013.01); *B23K 26/703* (2015.10); *B01D 63/065* (2013.01); *B01D 2313/025* (2013.01); *B01D 2313/04* (2013.01); *B01D 2325/04* (2013.01); *B23K 2101/06* (2018.08); *B23K 2103/05* (2018.08); *B23K 2103/08* (2018.08); *C01B 3/503* (2013.01); *C01B 3/508* (2013.01); *Y10S 55/05* (2013.01)

(58) Field of Classification Search
CPC .. B23K 2103/05; B23K 2101/06; B23K 1/20; B23K 35/32; B23K 2103/08; B23K 3/085; B23K 2103/18; B23K 26/211; B23K 1/203; B23K 26/0823; B23K 26/14; B23K 26/147; B23K 3/04; B23K 3/08; B01D 69/02; B01D 69/04; B01D 71/022; B01D 2313/04; B01D 2325/04; B01D 2313/025; B01D 65/003; B01D 71/0221; B01D 63/065; B01D 71/02231; C01B 3/503; C01B 3/508; Y10S 55/05
USPC .................................................. 219/121.63
See application file for complete search history.

(56) References Cited

U.S. PATENT DOCUMENTS

| | | | | |
|---|---|---|---|---|
| 5,407,119 A | * | 4/1995 | Churchill | C04B 37/006 228/232 |
| 5,498,278 A | * | 3/1996 | Edlund | B01D 69/12 95/56 |
| 5,645,626 A | * | 7/1997 | Edlund | B01D 63/08 95/56 |
| 6,152,987 A | | 11/2000 | Ma et al. | |
| 7,001,446 B2 | | 2/2006 | Roark et al. | |
| 7,022,165 B2 | * | 4/2006 | Paglieri | B01D 53/22 29/890.044 |
| 7,297,183 B2 | * | 11/2007 | Edlund | C01B 3/501 95/55 |
| 7,353,982 B2 | * | 4/2008 | Li | B01D 71/02231 228/234.1 |
| 8,753,433 B2 | * | 6/2014 | Haring | B01D 53/22 95/55 |
| 10,105,641 B2 | * | 10/2018 | Yoshimura | B01D 71/022 |
| 11,491,589 B2 | * | 11/2022 | Ragnarsson | B23K 1/0056 |
| 2006/0060084 A1 | | 3/2006 | Edlund et al. | |
| 2006/0162563 A1 | | 7/2006 | Poschmann | |
| 2009/0114625 A1 | * | 5/2009 | Palmquist | B23K 1/0056 219/121.64 |
| 2010/0068132 A1 | * | 3/2010 | Vencill | B01J 19/0093 96/9 |
| 2015/0368762 A1 | * | 12/2015 | Liang | C01B 3/503 148/668 |
| 2019/0001275 A1 | * | 1/2019 | Haydn | B01D 69/108 |
| 2020/0016541 A1 | * | 1/2020 | Haydn | B01D 63/065 |

FOREIGN PATENT DOCUMENTS

| | | | | |
|---|---|---|---|---|
| CN | 101626865 A | | 1/2010 | |
| CN | 101733496 A | | 6/2010 | |
| CN | 101918171 A | | 12/2010 | |
| CN | 102145420 A | | 8/2011 | |
| CN | 106413943 A | | 2/2017 | |
| JP | H11-250806 A | | 9/1999 | |
| JP | 3305484 B2 | * | 7/2002 | |
| JP | 2003-334418 A | | 11/2003 | |
| JP | 2005-199117 A | | 7/2005 | |
| JP | 2005200273 A | * | 7/2005 | ............ B01D 53/22 |
| JP | 2005-296746 A | | 10/2005 | |
| JP | 2006-032192 A | | 2/2006 | |
| JP | 2008000814 A | * | 1/2008 | |
| JP | 4270014 B2 | * | 5/2009 | |
| JP | 2013-248651 A | | 12/2013 | |

OTHER PUBLICATIONS

Machine English Translation of JP-3305484-B2 (Year: 2002).*
Machine English Translation of JP-2005200273-A (Year: 2005).*
Machine English Translation of AT-12132-U1 (Year: 2011).*
Machine English Translation of JP-2008000814-A (Year: 2008).*
First Chinese Office Action for Chinese Patent Application No. 201880043428.0 mailed Mar. 3, 2021, 14 pages.
Extended European Search Report for European Patent Application No. 18823681.4 mailed Mar. 5, 2021, 7 pages.
International Search Report and Written Opinion of the International Searching Authority for International Patent Application No. PCT/AU2018/050636 mailed Aug. 6, 2018, 8 pages.
International—Type Search Report for Australian Patent Application No. 2017902556 mailed Mar. 26, 2018, 11 pages.
Chen, C., "Sulfur Tolerance of Pd/Au Alloy Membranes for Hydrogen Separation from Coal Gas", A PhD thesis submitted to Worcester Polytechnic Institute, 433 pgs. (Sep. 2011).
Office Action for Japanese Patent Application No. 2019-572185 mailed Jan. 31, 2022, 8 pages.

* cited by examiner

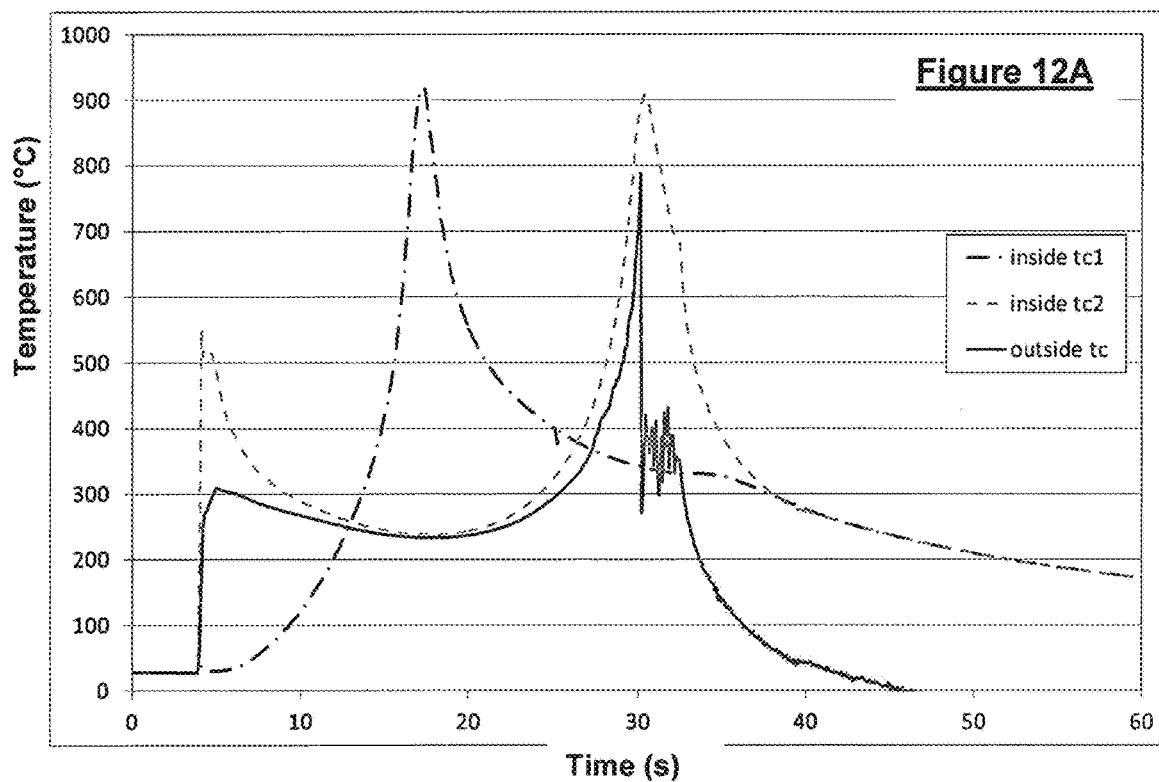
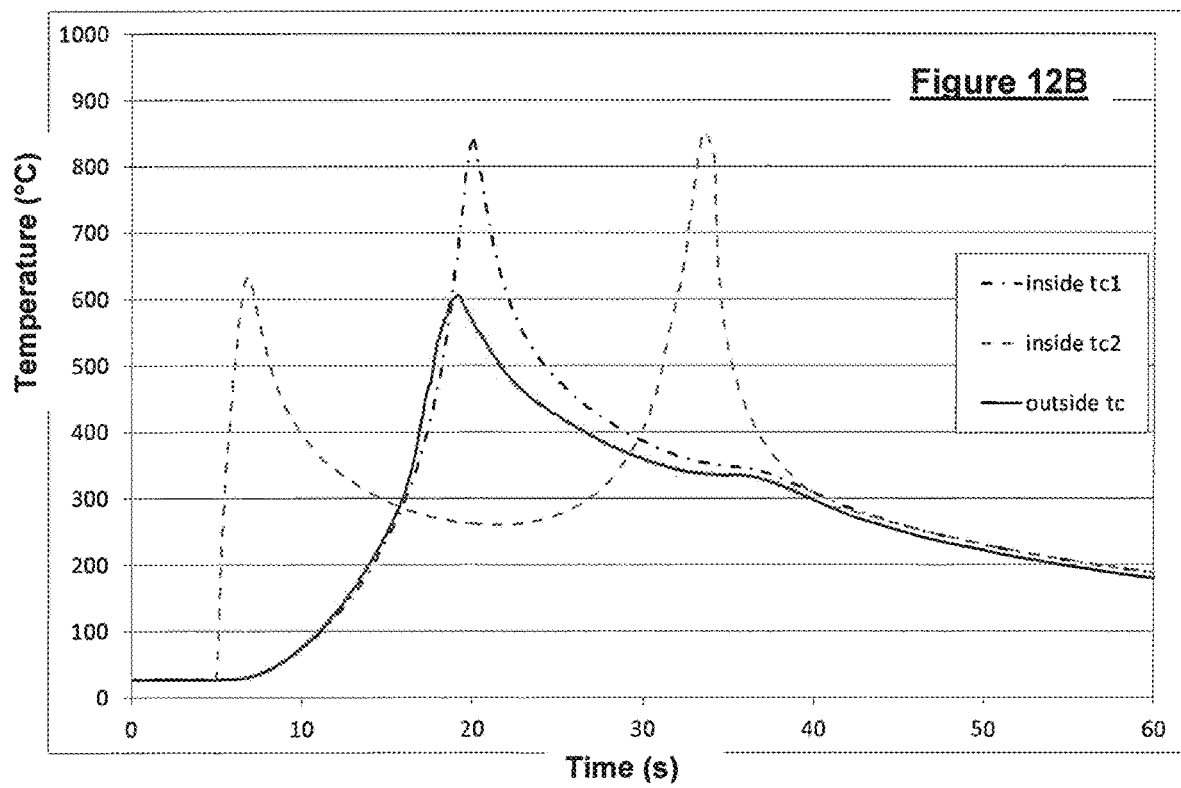

METHOD OF JOINING AND SEALING A VANADIUM BASED MEMBRANE TO A METALLIC CONNECTION SECTION

This application is a National Stage Application of PCT/AU2018/050636 filed 25 Jun. 2018, which claims priority from Australian provisional patent application No. 2017902556 filed 30 Jun. 2017, the contents of which are to be understood to be incorporated into this specification by this reference. To the extent appropriate, a claim of priority is made to each of the above disclosed applications.

TECHNICAL FIELD

The present invention generally relates to a method of joining and sealing a vanadium based membrane to a metallic connection section. The invention is particularly applicable to joining a tubular vanadium or vanadium alloy membrane to a stainless steel body and it will be convenient to hereinafter disclose the invention in relation to that exemplary application. However, it is to be appreciated that the invention is not limited to that application and could be used to join a vanadium based body to metallic connection section in any suitable application.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Hydrogen ($H_2$) does not occur naturally in great abundance, and in industrial practice it is produced by the conversion of a hydrocarbon fuel such as coal, petroleum or natural gas, or through the decomposition of ammonia ($NH_3$). Each of these production routes produces an impure gas stream containing $H_2$ plus unreacted feed gases (e.g., $CH_4$, $H_2O$, $NH_3$) and by-products such as $CO_2$, CO and $N_2$. For many applications, the $H_2$ must be separated from this mixed gas stream.

Membrane-based separation technology is currently under development for the separation of $H_2$ from mixed gas streams. Broadly speaking, a membrane is a near two-dimensional structure which is selectively permeable to one species. In the context of gas separation, a membrane allows one species to selectively permeate (usually $H_2$), while blocking other species (e.g. CO, $CO_2$, $H_2O$, $N_2$ etc.). Hydrogen-selective membranes can be created from inorganic, metallic or ceramic materials, each of which has characteristic hydrogen throughputs, operating temperatures and selectivity.

Palladium is the best known alloy membrane material, having an ability to permeate hydrogen between 300 to 600° C. whilst being tolerant to syngas species such as CO and $H_2O$. However, the high cost of palladium (~$US 330/m²/μm (2014)), has driven research towards minimising its consumption, most notably through alloying with less-expensive metals, and minimising thickness by depositing very thin (<5 μm) layers on support structures with very fine pores.

A number of other metals exhibit very high hydrogen permeability, most notably vanadium, titanium, tantalum and zirconium. At 400° C., the hydrogen permeability of these metals is around two orders of magnitude greater than palladium, and the raw materials prices are significantly lower. Of these metals, vanadium has the widest alloying range, which means it has the widest scope for modifying the alloy properties to meet the demands of a vanadium based membrane. One example of vanadium based membranes is taught in the Applicant's United States patent publication No. US20150368762A1.

Vanadium based membranes must be connected and sealed with another tube or pipe to provide a flow path for the extracted $H_2$ and to prevent passage of non-$H_2$ gas species through the membrane. The joining technique is ideally selected to:

NOT alter the microstructure of the V based tube;
NOT damage any catalyst layers applied to the inside and outside of the V based tube; and
retain seal during cycling under $H_2$ when used in the membrane separation device.

One connection and sealing technique fulfilling the above for tubular vanadium based membranes utilises compression fittings, such as stainless steel compression fittings combined with an appropriate ferrule, for example graphite ferrules, to connect the vanadium tubular membrane to a similar diameter stainless steel tube. However, the use of compression fittings can limit the packing density of the tubular membranes within the reactor due to the necessary oversized diameter of the fittings compared to the tubular diameter for fitment. Closely-packed membranes are more efficient because they provide greater surface area within a reactor volume thereby providing greater $H_2$ recovery from mixed gas streams, and increase the amount of $H_2$ which can be recovered from a membrane module of a given volume.

It would therefore be desirable to provide an improved and/or alternate method of connecting and sealing a vanadium or vanadium alloy based tubular membranes to an adjoining metallic tube or pipe.

SUMMARY OF THE INVENTION

A first aspect of the present invention provides a method of joining and sealing a vanadium based membrane to a metallic connection section comprising:

mounting a section of a vanadium based membrane on a connector formation of a connection section, the connection section being formed of a different metal to the vanadium based membrane, the connector formation providing a recess into which a section of the vanadium based membrane is seated and a connection interface in which the end face of the vanadium based membrane is proximate to or substantially abuts an adjoining face of the connector formation;

mounting and operating a chiller arrangement in thermal contact with vanadium based membrane proximate the connection interface;

heating a filler metal on the connection section to at least the liquidus temperature of the filler metal using a laser beam directed onto the filler metal located on the connection section and having a beam edge positioned at an offset location spaced apart from the connection interface a distance that attenuates direct heating of the vanadium based membrane by the laser beam, and on the connection section, such that the filler metal can flow over the connection interface from the offset location onto the the vanadium based membrane; and cooling the filler metal to form a bridging section of filler metal between the vanadium based membrane and connection section over the connection interface.

This first aspect of the present invention therefore provides a brazing technique for joining a vanadium based membrane (i.e. vanadium or vanadium alloy based membrane) to a different metal, preferably stainless steel, which utilises a laser joining technique. Laser joining, such as laser welding, is a technique that allows the applied heat load to be localised due to the narrow and concentrated nature of the laser heat source used. The offset application of the laser beam in heating and melting the filler metal in combination with use of a chiller arrangement is designed to limit heat exposure of the vanadium tube during laser welding in order to minimise and preferably prevent any alteration to the microstructure and chemical composition of the vanadium based membrane; and not damage any catalyst layers applied to the outside of the vanadium based membrane.

In this respect, the offset positioning of the laser beam is used to attenuate, and preferably prevent the vanadium based membrane from being directly heated by the laser beam. Furthermore, the use of a chiller arrangement thermally connected to the vanadium based membrane proximate the connection interface ensures that the vanadium based membrane is not excessively heated via heat conduction and the like from the connection section to the vanadium based membrane. The resulting brazed product can therefore substantially retain the desired vanadium based material crystal structure and mechanical properties.

The filler metal is designed to wash over the connection interface once heated to form a bridging body across the connection interface once solidified. The filler metal can comprise of any suitable metal or metal alloy that can be melted to form a bridging section between the connection section and the vanadium based membrane. The filler metal preferably has a melting point (liquidus temperature) similar to vanadium and the metal forming the connection section, typically stainless steel. However for application purposes, the filler metal is preferably selected to have a lower liquidus temperature than both the vanadium based membrane and the metallic connection section. The filler metal also preferably has a high ductility to accommodate expansion of vanadium based membrane and resistance to $H_2$. The particular alloy is generally selected to on the basis of desired liquidus temperature and resulting mechanical properties. A number of possible filler metals are possible, including at least one of aluminium-silicon, copper, copper alloy, gold-silver alloy, nickel alloy or silver. The filler metal preferably comprises copper or an alloy of copper such as copper-silver, copper-zinc, copper-silicon or copper-tin. In some embodiments, the filler metal comprises a Cu—Si alloy or Cu—Si—Mn alloy. In some instances, the filler metal comprises a commercially available filler metal wire. However, it should be appreciated that custom filler metal compositions can also be produced. In some embodiments, the filler metal comprises a Cu, Si, Mn alloy, for example (Cu, 3% Si, 1% Mn).

During the heating step, the filler metal typically forms a droplet having a center at the center of the laser beam. The diameter of the droplet is determined by the amount of filler metal melted. However, the diameter of the droplet must be sufficient to form the bridging section of filler metal over the connection interface. Movement of the laser beam and filler metal relative to the connection interface (and therefore the vanadium based membrane and connector formation) forms a continuous body of filler metal across connection interface interconnecting the vanadium based membrane and connection section about the connection interface and sealing gap between those bodies at that connection interface. For tubular vanadium based membranes and connection sections, a continuous body of filler metal across connection interface around the circumference of the adjoining tubular bodies effectively joins and seals those tubular bodies together.

It should be appreciated that sealing in the context of the present invention comprises forming a fluid tight seal between the vanadium based membrane a metallic connection section in which fluid (including liquid and gas) cannot leak or otherwise flow through the connection between the vanadium based membrane and metallic connection section. In the context of a use of a vanadium based membrane as a separator, catalytic membrane reactor (CMR) or the like, gas such as hydrogen therefore is prevented from flowing through the join or connection between the vanadium based membrane and metallic connection section.

The arrangement is also set up so that the offset location is positioned on the connection section, with the edge of the laser beam (or beam edge i.e. the outer periphery or edge of the laser beam directed onto a surface, typically the perimeter of the circle of laser spot formed on that surface) being offset or spaced apart from the connection section a distance that attenuates heat transfer from the laser beam to the vanadium based membrane. The offset distance preferably substantially avoids direct heating of the vanadium based membrane. In embodiments, that offset distance can be at least 0.1 mm from the connection interface. This ensures that the vanadium based membrane is not directly heated by the laser beam. In embodiments, the beam edge is spaced apart at least 0.2 mm offset from the connection interface, preferably between 0.2 mm and 1 mm. It should be noted that as the laser beam moves relative to the connection interface (and thus the surfaces of the vanadium membrane and the connection formation facing the laser beam) the offset location typically tracks a parallel spaced apart line relative to the connection interface in order to maintain the offset position.

The connection section can be formed of any suitable metal or metal alloy onto which it is desired to mount the vanadium based membrane. In some embodiments, the connection section is comprised of at least one of: steel, stainless steel, nickel-chromium-iron alloys or a combination thereof. Examples of suitable materials include austenitic stainless steel, preferably a 300 series stainless steel, for example 304, or 316 stainless steel.

The vanadium based membrane can be formed from vanadium or a vanadium alloy. Typically, the particular vanadium metal or alloy is selected based on its suitability for use in a membrane separation device. In some embodiments, the vanadium based membrane comprises a vanadium alloy comprising: vanadium; aluminium having a content of greater than 0 to 10 at %; and Ta content of less than 0.01 at %, having a ductility of greater than 10% elongation, preferably greater than 11% elongation. The vanadium alloy can further comprise a grain refining element selected from Ti, Cr, Fe, Ni or B having a content of greater than 0 to 5 at %, preferably between 0.2 and 4.5 at %. In some embodiments, the grain refining element has a content from 0.1 to 2 at %, preferably from 0.1 to 2 at %, and more preferably from 0.1 to 1 at %.

The vanadium based membrane can have any suitable configuration. In some embodiments, the membrane comprises a planar membrane. However, in exemplary embodiments, the vanadium based membrane is tubular. The tubular membranes can have any suitable dimensions as described previously. In some embodiments, the thin-walled tube comprises a tube having an outer diameter of between 2 to 25 mm, preferably between 3 and 20 mm and a wall thickness of from 0.05 to 1 mm, preferably from 0.1 to 1.5 mm, as discussed in more detail below. In some embodiments, the vanadium based membrane has a thickness of from 0.1 to 1 mm, preferably from 0.2 to 0.8 mm, more preferably from 0.2 to 0.5 mm.

The connection section can have any suitable configuration. In some embodiments, the connection section is a planar. However, in exemplary embodiments, the connection section is tubular. The connection section can have any suitable dimensions. In embodiments, the connection section has a thickness of from 1 to 5 mm, preferably from 1 to 3 mm, more preferably from 1 to 2 mm.

The laser beam is used to heat the filler metal to at least its liquidus temperature to enable the filler metal to flow across the connection interface and form a bridging section of filler metal between the vanadium based membrane and connection section over the connection interface. It should be appreciated that the filler metal flows over the surfaces of the vanadium membrane and the connection formation facing the laser beam, herein after referred to as the laser facing surfaces of the vanadium membrane and the connection formation. The connection interface is preferably a tight abutting fit. However, in embodiments, filler material may also flow into any gaps or recesses between the abutting faces in the connection interface from those laser facing surfaces by capillary action. The bridging section of filler metal is therefore formed across the connection interface over the laser facing surfaces of the vanadium membrane and the connection formation proximate the connection interface.

The laser beam can heat the filler metal to any selected temperature. In embodiments, the laser beam heats the filler metal to the liquidus temperature of the filler metal plus at least 5° C., preferably plus at least 10° C., more preferably the liquidus temperature of the filler metal plus from 5 to 15° C.

The beam width of the laser beam is an important consideration in both the positioning of the laser beam relative the connection interface, and the amount of energy concentration in the brazing process. In embodiments, the laser beam has a beam width of between 0.4 and 1.5 mm. In some embodiments, the laser beam has a beam width of between 0.5 and 1.0 mm, more preferably between 0.6 mm and 0.9 mm, and yet more preferably about 0.9 mm.

The ratio of the beam edge offset to beam width provides a guide to the energy control strategy for this method. In embodiments, the ratio of the beam edge offset to beam width is from 0.1 to 0.5, preferably from 0.2 to 0.4, more preferably from 0.25 to 0.35. It is noted in one particular embodiment, the ratio of the beam edge offset to beam width is used which provides a good balance between covering the join and not melting the vanadium.

The connector formation comprises any recess formation in which the vanadium based membrane can be seated within and/or on the connection section. In embodiments, the connector formation comprises a rebate formed within the edge of the connection section sized to seat an end section of the vanadium based membrane therein. The rebate depth preferably substantially corresponds to the thickness of the vanadium based membrane. However, it should be appreciated that any suitable formation could be used for example a lap joint or similar which closely positions, preferably abuts the adjoining end sections of the vanadium based membrane and the connection section together.

The connector formation can be sized to seat any suitable length of the vanadium based membrane. In embodiments, the connector formation can be sized from 5 to 30 mm length of the vanadium based membrane, preferably from 10 to 20 mm, more preferably about 15 mm length of the vanadium based membrane.

The connection interface comprises the join or interface between abutting or adjoining faces of the vanadium based membrane and the connection section. In embodiments, the connection interface comprises a substantially planar end face of the vanadium based membrane being arrange in parallel abutting or adjoining relationship to a substantially planar adjoining face of the connector formation. Preferably, the planar end face of the vanadium based membrane is cooperatively shaped to abut the adjoining face of the connector formation with a tolerance of 20 to 40 μm, preferably 20 to 30 μm, and more preferably about 25 μm (10%).

It should be appreciated that the chiller arrangement includes a means to draw heat away from the heated/laser brazed join between the vanadium based membrane and connection section, such that the vanadium based membrane temperature is maintained below the recrystallisation temperature of vanadium. The recrystallisation temperature of vanadium is between 800 to 1010° C. Accordingly, the chiller arrangement is preferably selected to prevent the vanadium substrate from reaching a peak temperature of no greater than 800° C., more preferably no greater than 750° C. and even more preferably no greater than 700° C. during the laser joining/brazing process. The chiller arrangement preferably has a conductivity greater than the vanadium based membrane, and preferably has a thermal mass at least 5 times greater than the vanadium based membrane.

The chiller arrangement can comprise any suitable cooling or heat sink arrangement capable of extracting heat from the vanadium based membrane. In embodiments, the chiller arrangement comprises a conductive body configured to thermally contact, preferably conductively contact a section of the vanadium based membrane proximate the connection interface. However, it should be appreciated that refrigerated or other convective or conductive cooled arrangements could equally be used.

The chiller arrangement is preferably positioned proximate to the connection interface in order to best conduct any heat applied to connection interface and the vanadium based membrane from the heating step. In embodiments, the chiller arrangement is positioned within 10 mm, preferably less than 5 mm, more preferably less than 2 mm from the connection interface.

The filler material can be cooled by any suitable means to solidify the filler material in the bridging section of filler metal between the vanadium based membrane and connection section over the connection interface. In embodiments, the step of cooling the filler metal comprises allowing the filler metal to cool via convective cooling and/or conductive cooling through operative association with the chiller arrangement. However, forced cooling such as convective cooling, heat exchange, cooling fluids, refrigerants or the like could equally be used.

The bridging section of filler metal preferably comprises a body having a center at the offset location and extending over the connection interface by at least 0.3 mm. In embodiments, the bridging section of filler metal preferably comprises a body having a center at the offset location and extending over the connection interface by at least 0.5 mm, more preferably at least 0.8 mm, yet more preferably at least 1 mm. The bridging section can have any suitable shape and/or configuration. Due to droplet formation, the bridging section of filler metal typically has a semi-circular cross-section.

A second aspect of the present invention provides a laser brazing arrangement for joining and sealing a vanadium based membrane to a metallic connection section comprising:
- a vanadium based membrane mounted on a connector formation of a connection section, the connection section being formed of a different metal to the vanadium based membrane, the connector formation providing a recess into which a section of the vanadium based membrane is seated and a connection interface in which the end face of the vanadium based membrane is proximate to or substantially abuts an adjoining face of the connector formation;
- a chiller arrangement in thermal contact with vanadium based membrane proximate the connection interface;
- a laser welding arrangement including a laser beam which, in use, is directed at the connection section and has a beam edge of the laser beam positioned at an offset location spaced apart from the connection interface a distance that attenuates direct heating of the vanadium based membrane by the laser beam, and on the connection section; and
- a filler metal fed under laser beam at the offset location on the connection interface such that in use the filler metal is melted by the laser beam and can flow over the connection interface from the offset location onto the the vanadium based membrane.

It should be appreciated that this second aspect of the present invention can include any one or combination of the features described above in relation to the method comprising the first aspect of the present invention. Furthermore, in embodiments, the method according to the first aspect of the present invention can be performed using the laser brazing arrangement according to second aspect of the present invention.

The present invention also relates to a gas separation membrane system incorporating a vanadium based membrane joined and sealed to a connector formation prepared by the method of according to the first aspect of the present invention.

A third aspect of the present invention provides a laser brazed joint between a vanadium based membrane and a metallic connection section comprising:
- a vanadium based membrane mounted on a connector formation of a connection section, the connection section being formed of a different metal to the vanadium based membrane, the connector formation providing a recess into which a section of the vanadium based membrane is seated and a connection interface in which the end face of the vanadium based membrane is proximate to or substantially abuts an adjoining face of the connector formation; and
- a bridging connection formed from a solidified filler metal, the bridging connection being centered about an offset location spaced apart at least 0.1 mm from the connection interface and on the connection section and extending over the vanadium based membrane and connection section,
- wherein the vanadium based membrane of the laser brazed joint has a microstructure proximate to the bridging connection that is substantially the same as the bulk microstructure of the vanadium based membrane.

This third aspect of the present invention therefore provides a laser brazed joint between a vanadium based membrane (i.e. vanadium or vanadium alloy based membrane) to a different metal, preferably stainless steel, which utilises a laser welding arrangement. The solidified filler metal is preferably formed from the filler metal being melted by a laser beam of a laser welding arrangement and flowing over the connection interface from the offset location onto the vanadium based membrane. As noted above, laser welding is a technique that allows the applied heat load to be localised due to the narrow and concentrated nature of the laser heat source used. The offset center of the bridging connection is indicative of offset application of the laser beam in heating and melting the filler metal, designed to limit heat exposure of the vanadium tube during laser welding in order to minimise and preferably prevent any alteration to the microstructure of the vanadium based membrane; and not damage any catalyst layers applied to the outside of the vanadium based membrane.

Using this technique, the vanadium based membrane of the laser brazed joint has a microstructure proximate to the bridging connection that is substantially the same as the bulk microstructure of the vanadium based membrane. In embodiments, the average grain size of the vanadium based membrane proximate the bridging connection is substantially the same as the average grain size of the vanadium based membrane. Preferably, the average grain size of the vanadium based membrane proximate the bridging connection within 10%, preferably 5% of the average grain size of the vanadium based membrane.

It is to be understood that the bulk microstructure of the vanadium based membrane comprises the general or overall microstructure of the vanadium based membrane across the length of that membrane. The microstructure of the vanadium based membrane laser brazed joint is therefore generally the same as the overall or bulk microstructure of the vanadium based membrane. The formation of the laser brazed joint, and more particularly the bridging connection therefore does not substantially alter the microstructure of the vanadium based membrane.

The bridging connection can be centered at any suitable offset location relative to the connection interface. In embodiments, the offset location is spaced apart at least 0.2 mm offset from the connection interface, preferably between 0.2 mm and 1 mm.

The connection section can be formed of any suitable metal or metal alloy onto which it is desired to mount the vanadium based membrane. In some embodiments, the connection section is comprised of at least one of: steel, stainless steel, nickel-chromium-iron alloys, or a combination thereof. Examples of suitable materials include austenitic stainless steel, preferably a 300 series stainless steel, for example 304, or 316 stainless steel.

The vanadium based membrane can be formed from vanadium or a vanadium alloy. Typically, the particular vanadium metal or alloy is selected based on its suitability for use in a catalytic membrane reactor (CMR). In some embodiments, the vanadium based membrane comprises a vanadium alloy comprising: vanadium; aluminium having a content of greater than 0 to 10 at %; and Ta content of less than 0.01 at %, having a ductility of greater than 10% elongation, preferably greater than 11% elongation. The vanadium alloy can further comprise a grain refining element selected from Ti, Cr, Fe, Ni or B having a content of greater than 0 to 5 at %, preferably between 0.2 and 4.5 at %. In some embodiments, the grain refining element has a content from 0.1 to 2 at %, preferably from 0.1 to 2 at %, and more preferably from 0.1 to 1 at %.

The vanadium based membrane can have any suitable configuration. In some embodiments, the membrane comprises a planar membrane. However, in exemplary embodiments, the vanadium based membrane is tubular. The tubular membranes can have any suitable dimensions as described previously. In some embodiments, the thin-walled tube comprises a tube having an outer diameter of between 2 to 25 mm, preferably between 3 and 20 mm and a wall thickness of from 0.05 to 1 mm, preferably from 0.1 to 1.5 mm, as discussed in more detail below. In some embodiments, the vanadium based membrane has a thickness of from 0.1 to 1 mm, preferably from 0.2 to 0.8 mm, more preferably from 0.2 to 0.5 mm.

The connection section can have any suitable configuration. In some embodiments, the connection section is a planar. However, in exemplary embodiments, the connection section is tubular. The connection section can have any suitable dimensions. In embodiments, the connection section has a thickness of from 1 to 5 mm, preferably from 1 to 3 mm, more preferably from 1 to 2 mm.

The connection interface comprises the join or interface between abutting or adjoining faces of the vanadium based membrane and the connection section. In embodiments, the connection interface comprises a substantially planar end face of the vanadium based membrane being arrange in parallel abutting or adjoining relationship to a substantially planar adjoining face of the connector formation. Preferably, the planar end face of the vanadium based membrane is cooperatively shaped to abut the adjoining face of the connector formation with a tolerance of 25 to 100 μm, preferably 25 to 50 μm, more preferably about 25 μm.

In embodiments, the interface between abutting or adjoining faces of the vanadium based membrane, the connection section and the filler material is sharp, with substantially no, preferably no melding or intermixing of these three distinct sections. The presence of a sharp interface means there is no dilution of the vanadium or connection section by the filler material from the laser braising process used to join the connection section and vanadium based membrane, and therefore advantageously avoids any delirious effect on material properties that would otherwise result if the materials mixed or melded.

A fourth aspect of the present invention provides at least one of a catalytic membrane reactor (CMR) or membrane separator including at least one vanadium based membrane joined and sealed to a connector formation prepared by the method of according to the first aspect of the present invention.

The membrane of the present invention can have any suitable configuration selected based on the particular advantages that configuration can provide to a particular CMR or membrane separator configuration.

A CMR is essentially a two-dimensional device which channels syngas along one dimension through a catalyst bed adjacent to a membrane. Flat membranes are easier and cheaper to produce than tubular membranes, but have a larger seal area, as the membranes are sealed around their outer edge. This sealing configuration provides more a large sealed area and therefore can be prone to leaks between the raffinate and permeate gas streams. A tubular membrane enables a tubular CMR to be used, and therefore can reduce the seal area. In tubular reactors seals are only required at each end of the tube. The joining and sealing method of the present invention can be used to provide these seals. Similar considerations are also applicable for membrane separator configurations.

In some embodiments, the membranes of the present invention have a tubular configuration, preferably comprising tubes. The tubes can have any desired dimensions. In some embodiments, the outer diameter is between 2 to 25 mm, preferably between 3 to 24 mm, preferably between 5 to 15 mm, preferably between 6 and 13 mm, and more preferably between 8 and 12 mm. In some embodiments, the wall thickness of the tube is less than or equal to 1 mm, preferably between 0.1 and 1.5 mm, preferably between 0.05 and 1 mm, more preferably less than 0.5 mm, and more preferably less than or equal to 0.25 mm. In one exemplary embodiment, the tubular membrane has the following specifications:

Length: ≥100 mm
Outer diameter: 9.52 mm (⅜")
Wall thickness: ≤0.25 mm

In exemplary bodies, the tubular membrane comprises a thin-walled tube comprising a vanadium alloy comprising: vanadium; aluminium having a content of greater than 0 to 10 at % and Ta content of less than 0.01 at %, having a ductility of greater than 10% elongation, preferably greater than 11% elongation.

It should be appreciated that the alloying content and mechanical properties, particularly ductility, of the membrane of the tenth aspect of the present invention is the same as described above for the first and second aspects of the present invention, and should be understood to equally apply to this aspect of the present invention.

In some embodiments, the vanadium alloy further comprises a grain refining element selected from Ti, Cr, Fe, Ni or B having a content of greater than 0 to 5 at %, preferably between 0.2 and 4.5 at %. In some embodiments, the grain refining element has a content from 0.1 to 2 at %, preferably from 0.1 to 2 at %, and more preferably from 0.1 to 1 at %.

In some embodiments, the vanadium alloy has a grain linear intercept of less than 5.0 mm, preferably less than 5.5 mm, preferably less than 4.0 mm, preferably less than 4.5 mm, even more preferably less than 3.0 mm, yet even more preferably less than 2.0 mm and most preferably less than 1.0 mm all based upon a minimum sample size of 6 grains, preferably 8 grains.

In particular embodiments the microstructure comprises dendrites. In these embodiments, the grain linear intercept value is preferably less than 500 micrometres, preferably less than 450 micrometres, more preferably from 50 to 450 micrometres more preferably from 50 to 400 micrometres, even more preferably from 50 to 300 micrometres, more preferably from 100 to 350 micrometres and yet even more preferably from 100 to 200 micrometres, based upon a minimum sample size of 6 grains, preferably 8 grains.

In addition, it is also preferred that the vanadium alloy does not include any voids having an average size of greater than 0.5 mm, preferably no greater than 0.4 mm, preferably no greater than 0.3 mm. The grain linear intercept can be determined using method ASTM E112-113 through employment of the Olympus "Stream Essential" image analysis software Unless otherwise stated, the grain linear intercept is a measurement of the width perpendicular to the growth direction of the grain in situations where the grain are not equiaxed (e.g. columnar).

The tubular membrane can have any suitable dimensions as described above. In some embodiments, the thin-walled tube comprises a tube having an outer diameter of between 2 to 25 mm, preferably between 3 and 20 mm and a wall thickness of from 0.05 to 1 mm, preferably from 0.1 to 1.5 mm, as discussed in more detail below.

In embodiments, the vanadium alloy used to construct the vanadium substrate used in the present invention is a refined or heat treated vanadium alloy having being heat treated temperatures of from 800 to 1500° C. and pressures from 50 to 500 MPa. In embodiments, the heat treatment comprises subjecting the vanadium alloy at temperatures of from 1000 to 1400° C., preferably between 1050 to 1380° C., more preferably temperatures up to 1400° C., and yet more preferably about 1200° C. In embodiments, the heat treatment comprises subjecting the vanadium alloy to pressures from 50 to 400 MPa, preferably 75 to 350 MPa, and more preferably about 200 MPa.

In embodiments, heat treated vanadium alloy has a ductility of greater than 10% elongation, preferably greater or equal to 11% elongation, more preferably greater or equal to 13% elongation, yet more preferably greater or equal to 14% elongation.

A fifth aspect of the present invention provides use of a laser beam to form a laser brazed joint between a vanadium based membrane and a metallic connection section comprising:

mounting a section of a vanadium based membrane on a connector formation of a connection section, the connection section being formed of a different metal to the vanadium based membrane, the connector formation providing a recess into which a section of the vanadium based membrane is seated and a connection interface in which the end face of the vanadium based membrane is proximate to or substantially abuts an adjoining face of the connector formation; and mounting and operating a chiller arrangement in thermal contact with vanadium based membrane proximate the connection interface;

wherein the laser beam is used to heat a filler metal on the connection section to at least the liquidus temperature of the filler metal by directing the laser beam onto the filler metal located on the connection section and having a beam edge of the laser beam positioned at an offset location spaced apart from the connection interface a distance that attenuates direct heating of the vanadium based membrane by the laser beam, and on the connection section, such that the filler metal can flow over the connection interface from the offset location onto the the vanadium based membrane; and the filler metal is cooled to form a bridging section of filler metal between the vanadium based membrane and connection section over the connection interface.

It should be appreciated that this fifth aspect of the present invention can include features described above for each of the first, second, third and fourth aspects of the present invention.

BRIEF DESCRIPTION OF THE DRAWINGS

The present invention will now be described with reference to the figures of the accompanying drawings, which illustrate particular preferred embodiments of the present invention, wherein:

FIGS. 12A and 12B provide a comparative experimental results to FIGS. 11A and 11B showing temperature vs time plot of two separate laser brazing runs conducted using the experimental laser brazing arrangement shown in FIG. 10, without use of the chiller.

DETAILED DESCRIPTION

Figure 1:
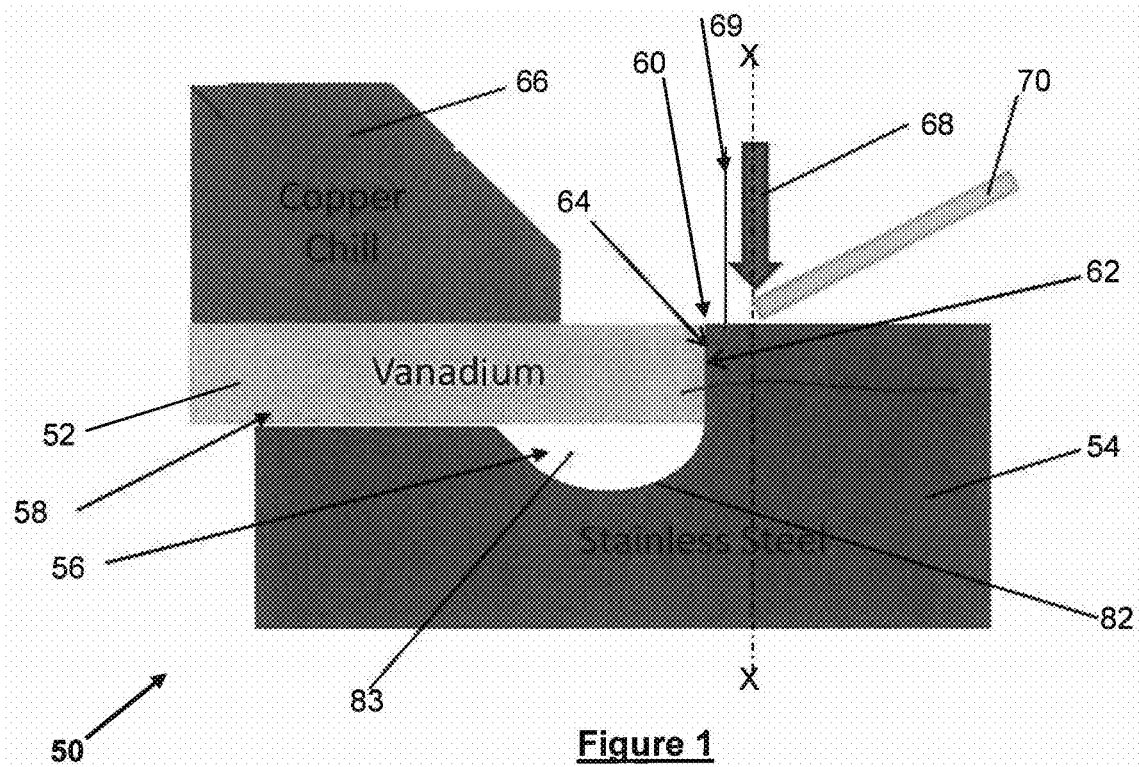
FIG. 1 provides a schematic illustration of the laser brazing method and arrangement according to embodiments of the present invention.

The present invention relates to a method and associated brazing technique for joining a vanadium or vanadium-alloy membrane to a different metal, preferably stainless steel, which utilises a laser joining/welding arrangement. The method comprises a laser brazing technique in which a filler metal is melted near the joint to join the different metals together. The resulting brazed joint enables the tubular membranes to be packed closer together within a reactor module of a given volume compared to equivalent tubular membranes connected and sealed to tubing using compression seal, thereby increasing the comparative separation efficiency for a given reactor module volume.

Joining different metals can be challenging due to the difference thermal and mechanical properties of the metals. This can be further challenging when the two materials to be joined have different thicknesses. For example, vanadium or vanadium-alloy membrane tubes used by the Applicant are typically much thinner and delicate than the metallic connection section on which the tube is to be connected. In embodiments, the V-tube has a thickness of 0.2 to 0.5 mm versus several mm for the metallic connection section. Furthermore, the joining technique should ideally:

NOT alter the microstructure of the V-alloy tube;
NOT damage the catalyst layers; and
retain its seal during cycling under $H_2$.

Laser welding is a welding technique that allows the applied heat load to be localised. A laser beam provides a concentrated heat source, allowing for narrow, deep welds and high welding rates. Laser beam welding has high power density (on the order of 1 MW/cm$^2$) resulting in small heat-affected zones and high heating and cooling rates. The beam width (spot size) of the laser can vary between 0.2 mm and 13 mm, though only smaller sizes are used for welding in the present invention. The depth of penetration is proportional to the amount of power supplied, but is also dependent on the location of the focal point: penetration is maximized when the focal point is slightly below the surface of the workpiece. The speed of welding is also proportional to the amount of power supplied but also depends on the type and thickness of the workpieces.

The present invention uses laser welding apparatus for a brazing process used join the vanadium based membrane to a connection section formed from a different material using a filler metal. Brazing provides the ability to join the same or different metals with considerable strength. As can be appreciated, brazing is a metal-joining process in which two or more metal items are joined together by melting and flowing a filler metal into the joint, the filler metal having a lower liquidus temperature than the adjoining metal. Brazing differs from welding in that it does not involve melting the work pieces and from soldering in using higher temperatures for a similar process, while also requiring much more closely fitted parts than when soldering.

In a brazing process, the filler metal is melted using a high temperature apparatus, which in the present invention is a laser welding beam. The filler metal is heated slightly above its melting (liquidus) temperature while protected by a suitable atmosphere or cover gas, such as Ar, and optionally a flux. However, it should be appreciated that a flux does not need to be used. The liquid filler metal flows over the base metal (known as wetting) and into any gap between close-fitting parts by capillary action. Cooling of the filler metal join the work pieces together. The connection provides a fluid tight seal between the vanadium based membrane and connection section.

Figure 2:
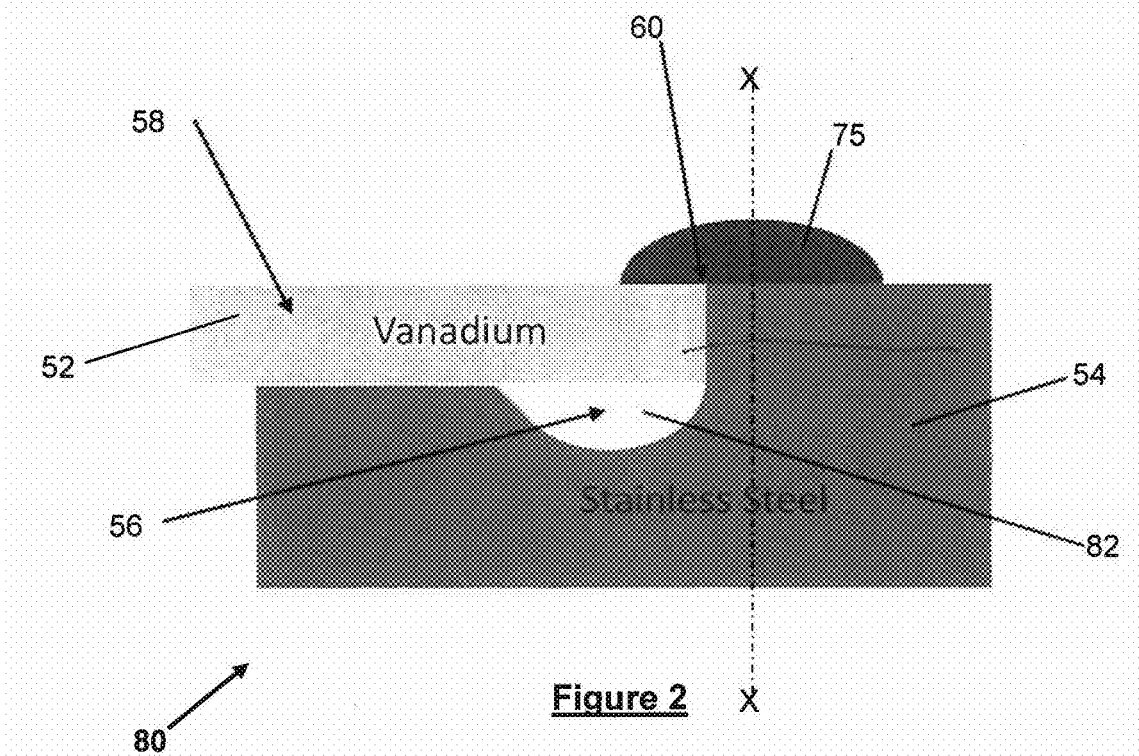
FIG. 2 provides a schematic illustration of the resulting laser braze join formed using the laser brazing method and arrangement illustrated in FIG. 1.

FIGS. 1 and 2 provide schematics illustrating a laser brazing arrangement and associated laser brazing method (FIG. 1) and resulting joined and sealed brazed product (FIG. 2) according to embodiments of the present invention.

FIG. 1 shows the basic brazing arrangement 50 according to embodiments of the present invention. This arrangement 50 comprises:
1) a vanadium based membrane 52;
2) a connection section 54 formed of a different metal to the vanadium based membrane, typically a stainless steel. The connection section 54 includes a connector formation 56, preferably a groove or recess into which an end section 58 of the vanadium based membrane 52 is seated. A connection interface 60 is formed between the end face 62 of the vanadium based membrane 52 and adjoining face 64 of the connector formation 56;
3) a chiller arrangement 66 in thermal contact with vanadium based membrane 52 proximate the connection interface 60;
4) a laser beam 68 from a laser welding arrangement (not illustrated). The laser beam 68 is positioned on the connection section 64 so that the laser beam 68 has a beam edge 69 positioned at an offset location X at least 0.1 mm away from the connection interface 60 and on the connection section 54. The laser beam has a beam width of between 0.4 and 1.5 mm; and
5) a filler metal 70 fed under laser beam 68 at the offset location X on the connection interface 60.

Figure 6A:
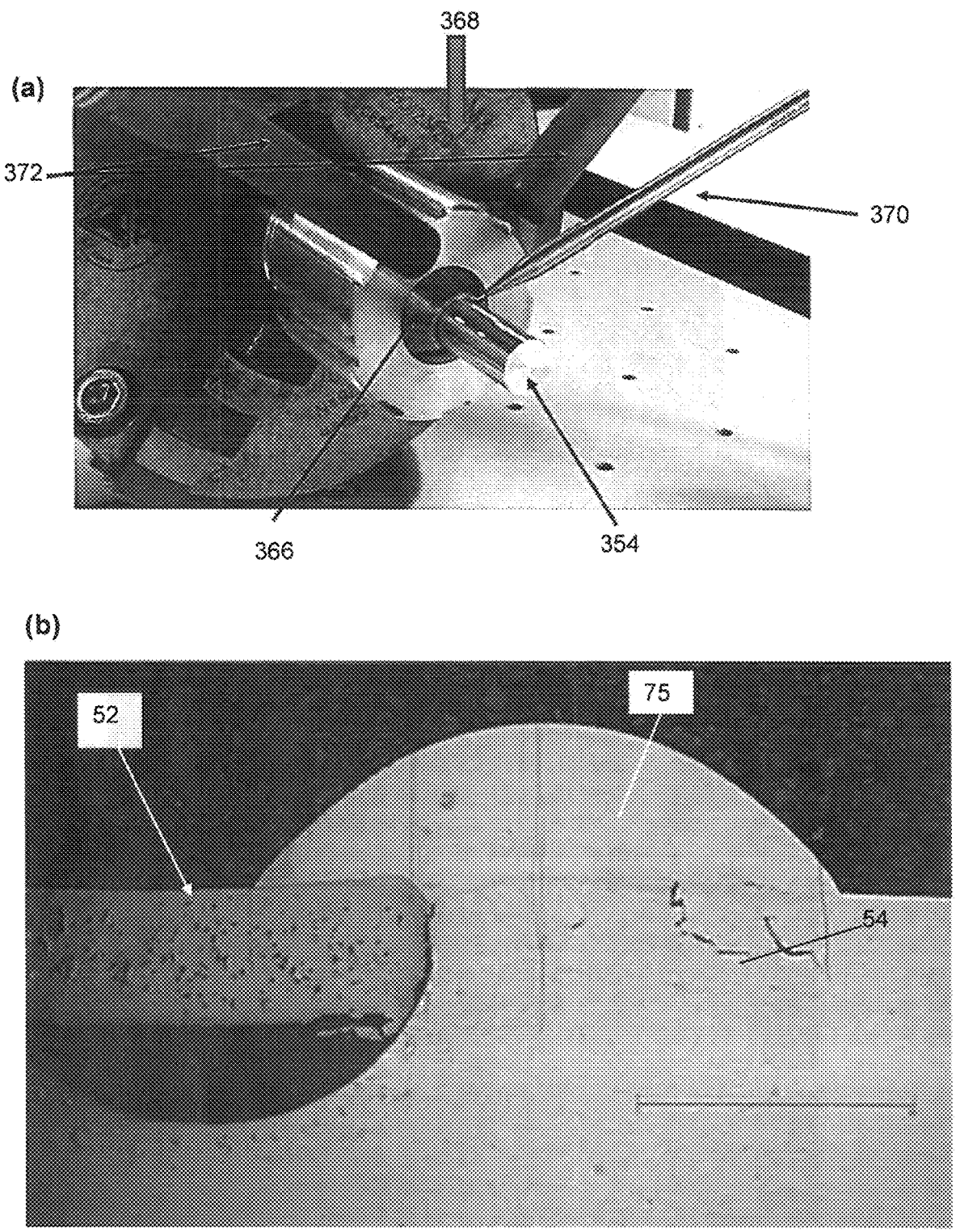
FIG. 6A illustrates (a) a photograph of a laser brazing method and arrangement according to one embodiment of the present invention; and (b) an optical micrograph of the resulting laser braised joint.

The laser brazing arrangement 50 is used to join and seal the vanadium based membrane to the metallic connection section. In this manner, the end section 58 of the vanadium based membrane 52 is mounted in the connector formation 56 with the end face 62 of the vanadium based membrane 52 proximate to, preferably abutting hard against the adjoining face 64 of the connector formation 56. The chiller arrangement 66 is then operated to chill the vanadium based membrane 52 proximate the connection interface 60. The chiller arrangement 66 is operated prevent the vanadium substrate from reaching a peak temperature below the recrystallisation temperature of vanadium, and therefore prevents the vanadium based membrane 52 of being heated to a peak temperature of no greater than 800° C. A selected filler metal 70 is fed into the offset location under the laser beam 68 to heat the filler metal 70 on the connection section 54 to at least the liquidus temperature of the filler metal 70 and, such that the filler metal 70 can flow over the connection interface 60 from the offset location X onto the upper surface of the vanadium based membrane 52. The melted filler metal 70 typically forms a droplet having a center at the center of the laser beam 68. The diameter of the droplet is determined by the amount of filler metal 70 melted which is sufficient to form the bridging section of filler metal 70 over the connection interface 60. Movement of the laser beam 68 and filler metal 70 relative to the connection interface, for example via rotation of the vanadium based membrane 52 and connection section 54 when these are tubular, and continuous supply of the filler metal 70 to the offset position X forms a continuous body of filler metal 70 across connection interface 60. The filler metal 70 is then cooled and thus solidifies to form a bridging section 75 (FIG. 2) of filler metal 70 between the vanadium based membrane 52 and connection section 54 over the connection interface 60. The filler metal 70 typically cools via convective cooling and/or conductive cooling through operative association with the chiller arrangement 66. However, forced cooling such as convective cooling or the like could equally be used. As shown in FIG. 2, the bridging section 75 of filler metal 70 comprises a body having a center at the offset location and extending over the connection interface by at least 0.3 mm. Due to droplet formation, the bridging section 75 of filler metal typically has a semi-circular cross-section, for example as is shown in FIG. 6A(b) and FIG. 7.

For tubular vanadium based membranes 52 and connection sections 54, a continuous body of filler metal 70 (i.e. the bridging section 75 of filler metal 70) across connection interface 60 around the circumference of the adjoining tubular bodies 52, 54 joins and seals those tubular bodies 52, 54 together.

The brazing method using the illustrated arrangement 50 limits heat exposure of the vanadium based membranes 52 during laser joining/welding by utilising both:
  the offset positioning of the laser beam 68 on the connection section 54 in heating and melting the filler metal 70 to prevent the vanadium based membranes 52 from being directly heated by the laser; and
  use of a chiller arrangement 66 to ensure that the vanadium based membrane 52 is not excessively heated via heat conduction from the connection section 54.

The combination of these features minimises and preferably prevents alteration to the microstructure of the vanadium based membranes 52 and not damage any catalyst layers applied to the outside of the vanadium based membranes 52, such as palladium or the like. The resulting braised product 80 (FIG. 2) therefore retains the desired crystal structure and mechanical properties of the vanadium based membrane 52.

The filler metal 70 can comprise any suitable metal or metal alloy that can be melted to form a bridging section between the connection section 54 and the vanadium based membrane 52. The filler metal 70 is selected to have a lower liquidus temperature than both the vanadium based membrane and the metallic connection section. As discussed previously, a number of filler materials can be used. In preferred embodiments, the filler metal comprises copper or a copper based alloy.

The connection section 54 can have any suitable configuration. However, where the vanadium based membrane 52 is tubular, the connection section 54 is also tubular. The connection section 52 can be formed of any suitable metal or metal alloy onto which it is desired to mount the vanadium based membrane 58. As described previously, the connection section is preferably comprised of an austenitic stainless steel, preferably a 300 series stainless steel, for example 304, or 316 stainless steel.

The vanadium based membrane 52 can be formed from vanadium or a vanadium alloy based on its suitability for use in a catalytic membrane reactor (CMR). An example of a suitable vanadium alloy is taught in the Applicant's patent publication US20150368762A1, the contents of which are incorporated into this specification by this reference. This vanadium alloy comprises: vanadium; aluminium having a content of greater than 0 to 10 at %; and Ta content of less than 0.01 at %, having a ductility of greater than 10% elongation, preferably greater than 11% elongation. The vanadium alloy can further comprise a grain refining element selected from Ti, Cr, Fe, Ni or B having a content of greater than 0 to 5 at %, preferably between 0.2 and 4.5 at %. The vanadium based membrane 52 can have any suitable configuration, but is preferably tubular as for example is described in US20150368762A1. An example of the grain structure of a vanadium tube prior to laser joining/welding is shown in FIG. 7(c).

The illustrated connector formation 56 comprises a rebate formed within the edge of the connection section 54 sized to seat an end section 58 of the vanadium based membrane 52 therein. The rebate has a depth that corresponds to the thickness of the vanadium based membrane 52. It is noted that the dip or trough 82 in the rebate is an artefact of the formation process of the planar face 64 of the connector formation 56, in which a milling tool is milled an additional depth into the base 83 of the rebate to ensure the entire planar face 64 of the connector formation 56 has a desired flatness. In this way, the connection interface 60 is formed from the flat abutting surfaces of the planar end face 62 of the vanadium based membrane 52 arranged in parallel abutting relationship to the planar adjoining face 64 of the connector formation 56.

The illustrated chiller arrangement 66 comprises a copper conductive body mounted abutting the end section 58 of the vanadium based membrane 52 seated in the connector formation 56. The chiller arrangement 66 conductively contacts that end section 58 proximate the connection interface 60. The chiller arrangement 66 is preferably positioned within 10 mm, preferably less than 5 mm from the connection interface 60. It should be appreciated that refrigerated or other convective or conductive cooled arrangements could equally be used.

Figure 3:
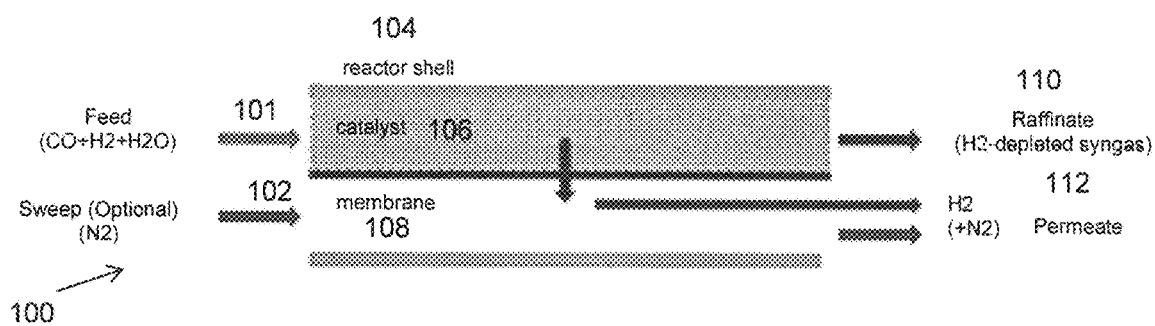
FIG. 3 illustrates a schematic of catalytic membrane reactor.

The vanadium based membrane 52 joined and sealed to a connection section 54 is typically used in a catalytic membrane reactor (CMR). A typical CMR 100 is shown in FIG. 3 illustrating the close coupling of the water-gas shift conversion catalyst 106 and $H_2$-selective membrane 108. The illustrated CMR 100 schematic shows a plate membrane with a $CO+H_2+H_2O$ feed 101, feed into the reactor shell 104, between which sits the catalyst 106 and membrane 108. The feed 101 undergoes that water-gas-shift (WGS) in the catalyst 106 to produce a raffinate 110 ($H_2$-depleted syngas) and $H_2$ permeate 112. An optional nitrogen sweep 102 can also be used for $H_2$ exiting the membrane. Being exothermic, the WGS reaction is favoured at lower temperatures, but reaction kinetics is favoured at high temperatures. To overcome this limitation, commercial WGS processes include a high temperature stage (~450° C., for fast kinetics, which reduces the required reactor size) and a low temperature stage (~200° C., to maximize conversion of residual CO from the high-temperature stage). A CMR allows the low-temperature reactor to be eliminated by allowing high WGS conversion at high temperature. Applied to the processing of coal-derived syngas, a CMR can achieve near-complete CO to $H_2$ conversion, $H_2$ purification and pre-combustion $CO_2$ capture in a single device. It should be appreciated that in other embodiments, the CMR could be used for other applications, for example natural gas reforming, ammonia decomposition or the like.

Figure 4:
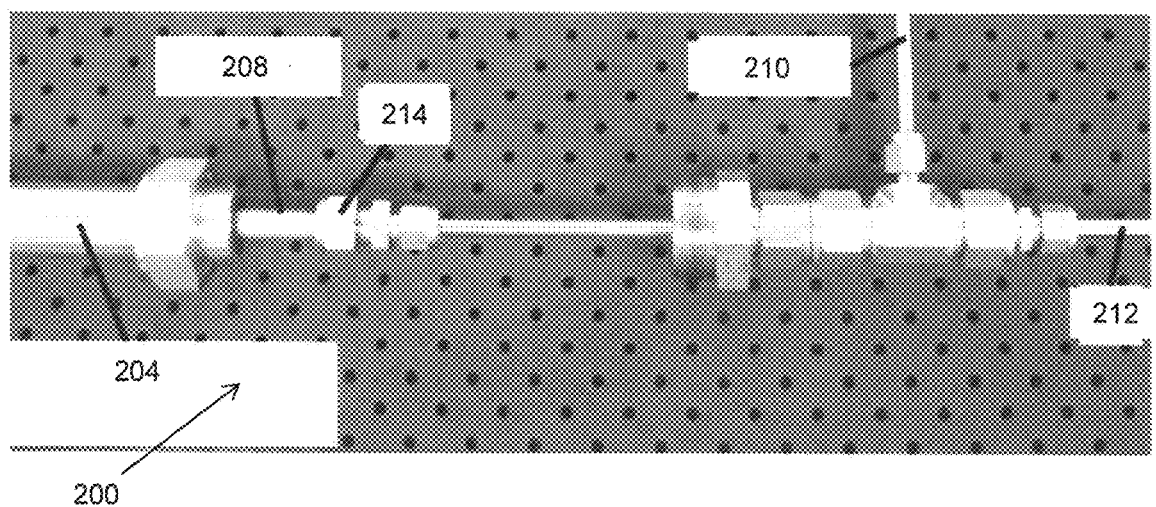
FIG. 4 provides a photograph of a prototype tubular catalytic membrane reactor (CMR).

A prototype tubular CMR 200 which can include a tubular membrane formed from the vanadium alloy of the present invention is shown in FIG. 4. The tubular CMR 200 incorporates a tubular membrane 208 within a tubular shell 204, with the catalyst occupying the annular space within the shell 204. The greatest advantage of this configuration is the reduced seal area, with seals (for example 214) required only at each end of the tube. Again, the CMR 200 produces a raffinate 210 ($H_2$-depleted syngas) and $H_2$ permeate 212. The tubular CMR also allows for greater use of readily available tubing and compression fittings, making for simple and reliable assembly.

The tubular configuration of the membrane offers a significant advantage over the planar configuration in terms of a greatly reduced sealing area, and simpler construction. Vanadium-based alloy membranes, when compared to palladium alloy membranes, offer a further advantage in manufacturing. Pd-based membranes must be very thin to minimise cost and maximise hydrogen permeance. This necessities the use of a porous support structure. The higher permeance of V-based alloys allows for thicker membranes which can be self-supporting. This greatly reduces the complexity and cost of the manufacturing process.

The desired alloy tubing is intended to have the following dimensions:
  diameter (2 to 25 mm); and
  wall thickness (0.05 to 1.00 mm).

Tubular membrane fabrication uses tensile deformation, which entrails material shape dimension and materials property requirements for the tensile deformation process:
  The pre-form materials for the deformation process have to be cast or sintered in sufficient size, for example, a cylinder shape of 25 to 50 mm diameter and 100 to 300 mm height. This presents a significant challenge for V based alloys, which have high meting temperatures (up to 2000° C.), requiring very high meting power, and leads to a tendency to react with refractory containment materials; and
  The feed materials should have sufficient ductility. It is considered that the materials with elongation below 10% are likely not suitable for the deformation processes aiming to produce small tubular membranes.

If the above properties are met, the standard production route for manufacturing small size tubular components can be used, which include rod casting, extrusion, and drawing.

EXAMPLES

Comparative Example 1—Direct Laser Welding

Figure 5:
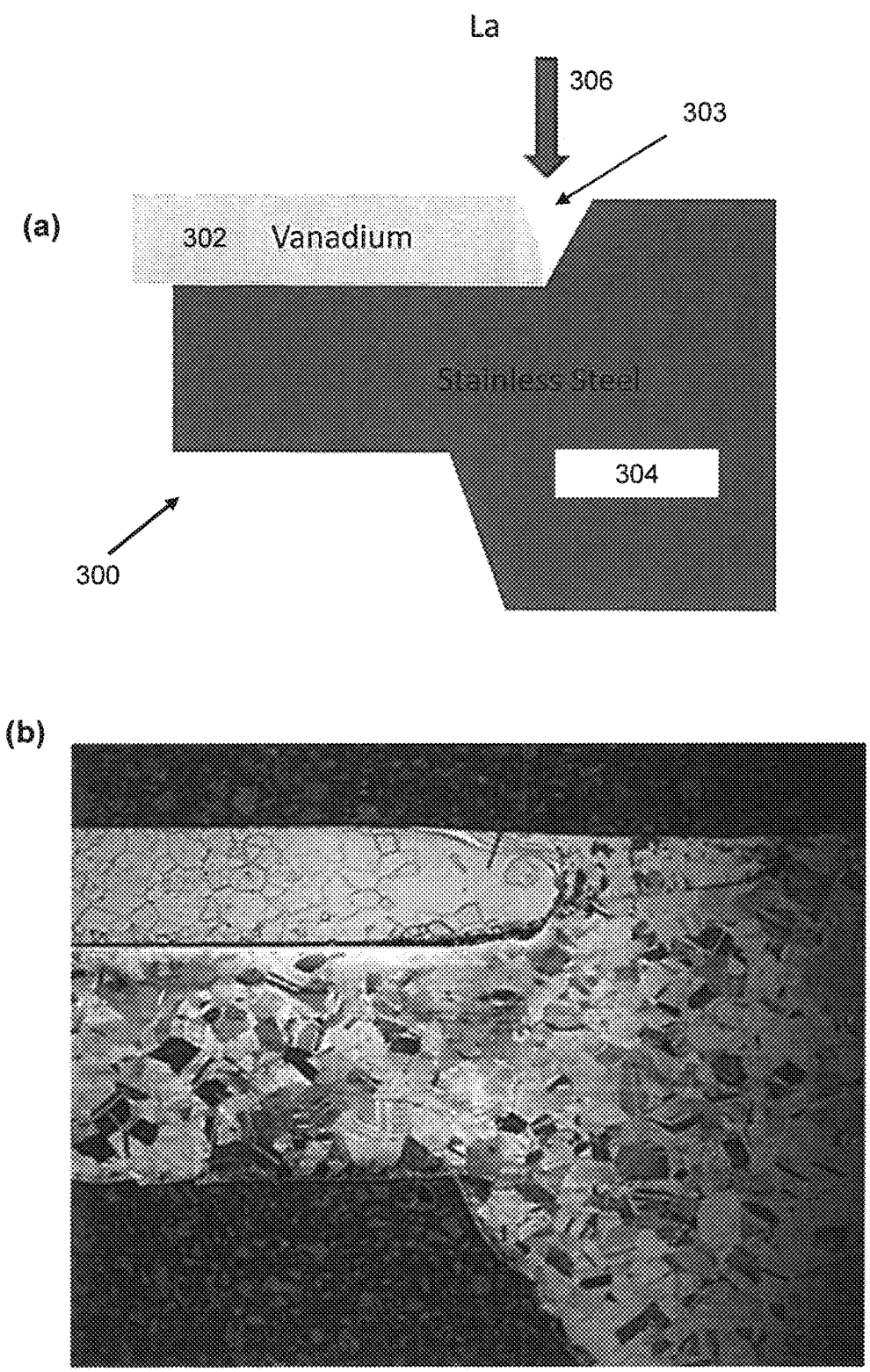
FIG. 5 illustrates a comparative laser welding example showing (a) a schematic representation of a laser welding technique used to join a vanadium tube to a stainless steel mount; and (b) an optical micrograph of the resulting laser welded joint.

A direct laser welding technique was investigated for joining a vanadium-aluminium alloy tube to a stainless steel mounting tube. A schematic of the experimental set up 300 is shown in FIG. 5. As shown in FIG. 5(a) a tubular vanadium tube 302 was seated in a mounting groove or rebate of a stainless steel mounting tube 304. The stainless steel mounting tube 304 was machined to include the mounting groove 303 which was sized to seat a short section (around 15 mm) of the vanadium tube 302 therein. Laser direction is shown by 306.

A 190V, 4.6 mS, 25 Hz laser welding apparatus (ALW 200, Alpha Lasers GmbH, Germany) was used to weld these two sections together. The laser welding apparatus used a 0.7 mm beam, which moved at 3.5 rpm and include a 0.4 mm Ni 20% Cr wire flux, which moved at 2 mm/s. As showed in FIG. 5(a) the laser beam 306 was projected directly onto the joint between the vanadium tube and the stainless steel mounting tube.

Referring to optical micrograph of the resulting welded joint shown in FIG. 5(b) reveals that the laser welding joins the vanadium metal and stainless steel at the joint. However, the microstructure of both the vanadium tube and the stainless steel are altered in the heat affected zone (HAZ) at the joint. In particular, the grain size of the vanadium tube in the HAZ proximate the join is much larger that the grain size in the body of the tube having resulted from dissolution of the metal in the HAZ. These large grains provide zones of weakness in the vanadium tube, where the tube is able to crack or otherwise fracture along the grain boundaries of the large grains.

The deleterious effect on grain morphology in the HAZ indicates that a direct laser welding technique is not suitable for joining and sealing vanadium based membranes to stainless steel or other metal connection sections.

Example 1—Laser Brazing

A laser brazing technique was investigated for joining a vanadium-aluminium alloy tube to a stainless steel mounting tube. The experimental set up is the same as illustrated in FIG. 1 as described above. A photograph of the setup is also provided in FIG. 6A(a). In this experiment, the connection section 54 (354 in FIG. 6A(a)) comprises a stainless steel mounting tube which was machined to include a mounting groove or rebate 56 as shown in FIG. 1. The mounting groove 56 was sized to seat a short section (around 15 mm) of the vanadium membrane tube 52 therein, and to provide a parallel abutting face 64 for the end face 62 of the vanadium membrane tube 52. As shown in FIGS. 1 and 6A(a), a copper chill block (66, FIGS. 1 and 366 in FIG. 6A(a) and shown in detail in FIG. 6B) was located in thermal contact with the vanadium membrane tube 52, proximate the connection interface 60 between the vanadium membrane tube 52 and the connection section 54. Shielding gas is provided via gas tubes 372 shown in FIGS. 6A(a) and 6C. This shielding gas comprises welding grade argon, 10 L/min directed onto the weld area.

Figure 6B:
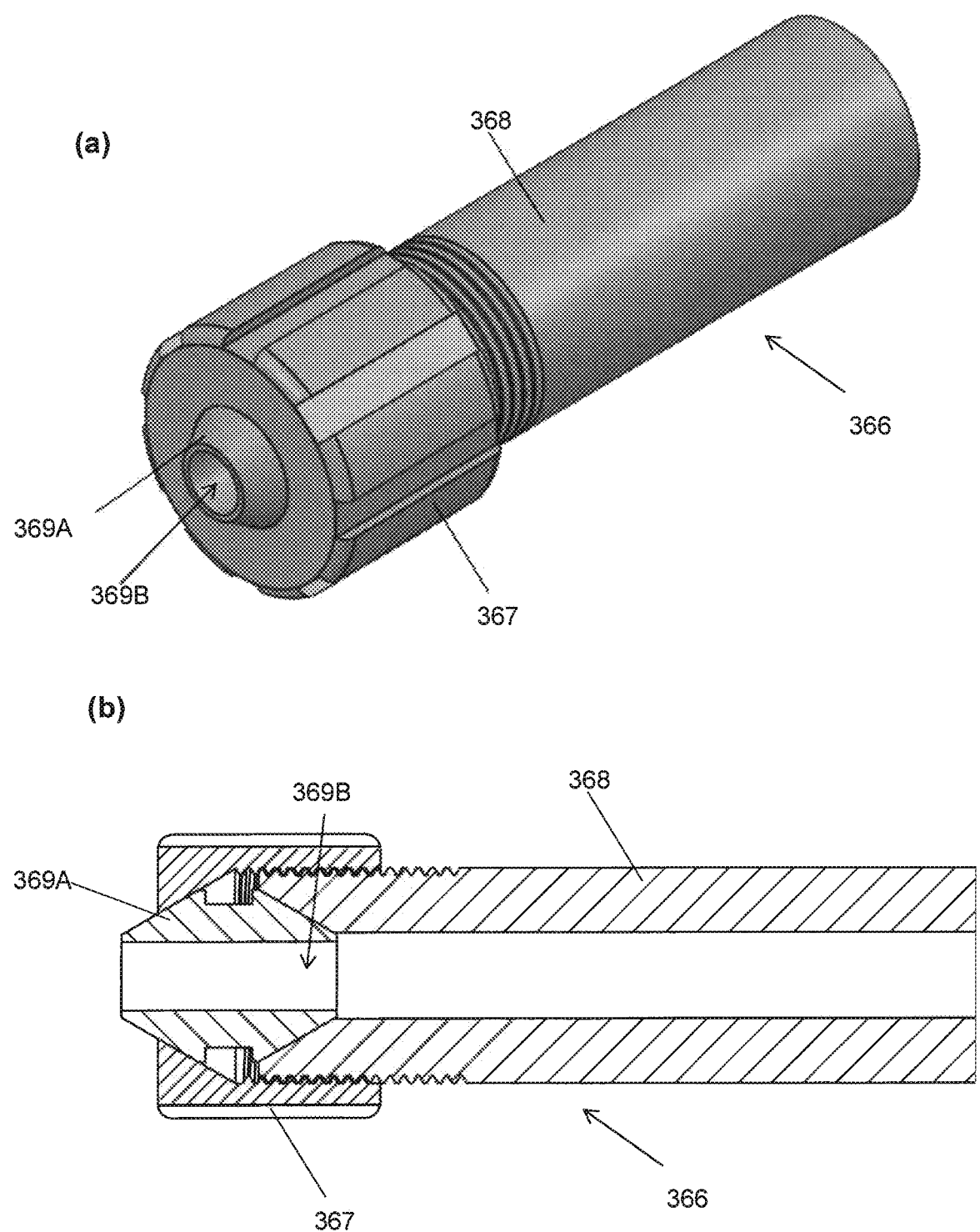
FIG. 6B illustrates (a) an isometric view of an embodiment of a chiller that can be used with the present invention; and (b) a longitudinal cross-sectional view of an embodiment of that chiller.

As shown in FIG. 6B, the copper chill block 366 comprises a three piece device which is mounted around the vanadium membrane tube 52 using opening/aperture 369B, close or proximate to the connection interface 60 between the vanadium membrane tube 52 and the connection section 54. Cap 367 is secured onto elongate body section 368 using a complementary thread and holds copper mount section 369A section therein. As shown in FIG. 6A(a), cap 367 is air cooled. In embodiments, copper mount section 369A is formed in two engagable halves. This assists in tightening the copper chill block 366 onto the membrane.

Figure 6C:
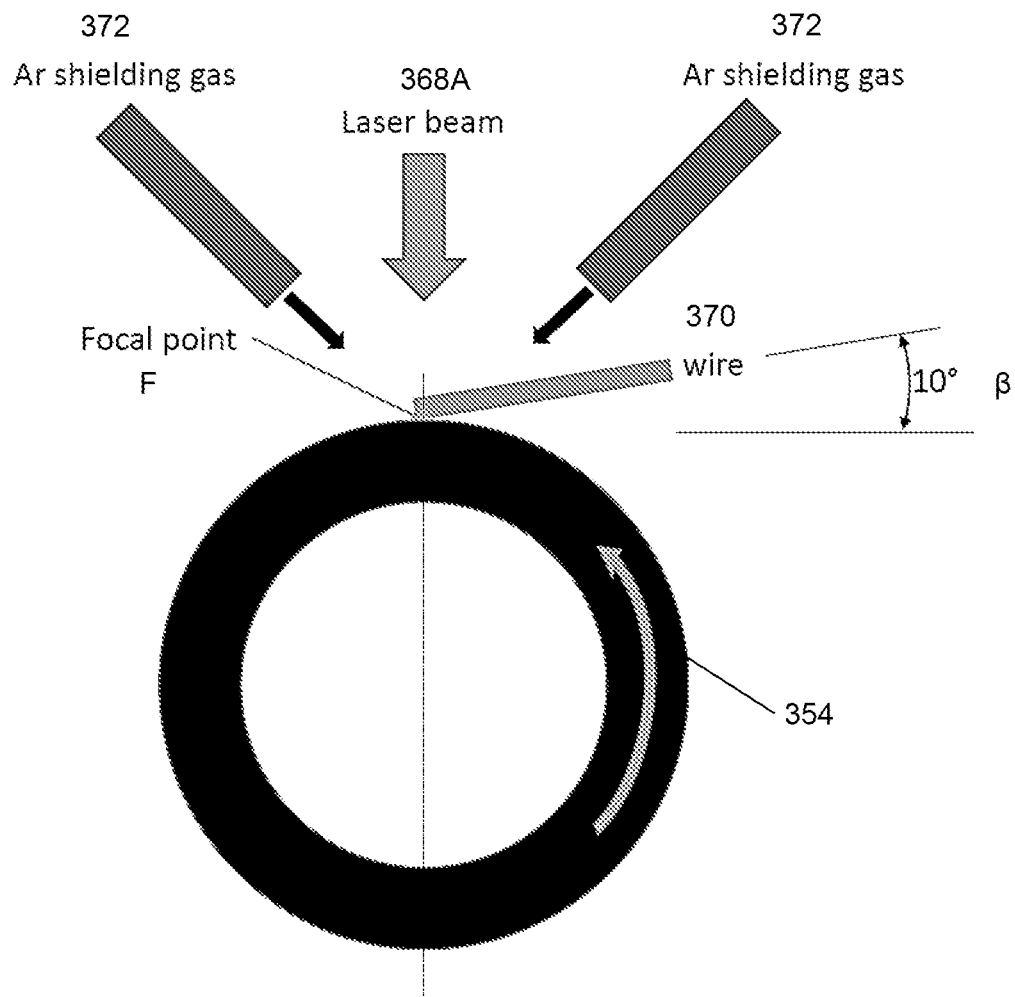
FIG. 6C provides a schematic illustration of the laser brazing method and arrangement according to embodiments of the present invention illustrating the angle of the filler wire is fed onto the tube.

A 220V, 4.6 mS, 25 Hz laser welding apparatus (not illustrated) (ALW 200, Alpha Lasers GmbH, Germany) was used to provide the laser beam used weld these two sections 52 and 54 together. The laser welding apparatus used a 0.8 mm beam, which moved at 3.5 rpm. The beam was directed towards the stainless steel surface proximate the joint, with a 0.3 mm offset from the joint. A 0.4 mm diameter Cu 3% Si, 1% Mn wire filler (370 in FIG. 6A(a)) was directed under the beam (368A in FIG. 6A(a)) and fed into that location at 2 mm/s. The laser beam 368A was applied to the stainless steel at focal point F (FIG. 6C) to melt the Cu 3% Si filler wire, and allowed to flow over the connection interface 60 from that offset position X. The offset is deliberately used to prevent the vanadium alloy tube from being directly heated by the laser beam 368A. The filler wire 370 was fed at a feed angle β of 10 degrees form horizontal as shown in FIG. 6C. Furthermore, the use of a chiller arrangement 66, 366 thermally connected to the vanadium membrane tube 52 proximate the connection interface 60 ensures that the vanadium membrane tube 52 is not excessively heated via heat conduction from the stainless steel connection section 54 to the vanadium membrane tube 52.

FIG. 6A(b) illustrates an optical micrograph of the resulting laser braised joint. The resulting joint has typical brazing configuration with the two materials joined by the Cu 3% Si filler forming a connection bridge over the two materials. No excessive melting appears to have occurred in either the stainless steel or the vanadium tube sections at or proximate the joint.

Example 2—Effect of Use of a Chiller/Chill Block

A laser brazing technique was investigated for joining a vanadium-aluminium alloy tube to a stainless steel mounting tube. The experimental set up is the same as illustrated in FIG. 1 as described above for Example 1. For a first experimental run, a copper chill block (66, FIG. 1 and 366 in FIG. 6A(a)) was located in thermal contact with the vanadium membrane tube 52, proximate the connection interface 60 between the vanadium membrane tube 52 and the connection section 54. Shielding gas is provided via gas tubes 372 shown in FIG. 6(a). For a second experimental run, the copper chiller block was not used. Optical micrograph images were obtained for a cross-section of each experimental sample to determine the grain morphology of each sample. SEM images of the chiller sample were also obtained.

FIGS. 7(a) and (b) provides optical micrograph of two samples which show the effect of the chill block on the grain size. It should be noted that each of the samples were mounted in a resin matrix for image purposes. Grain size measurements were undertaken using ASTM E112-12 using the linear intercept method. FIG. 7(c) shows the original grain size of the vanadium tube. The original grain size of the vanadium tube was around 41 microns. FIG. 7(a) shows the sample using the chill block. The average grain size was determined to be 41 microns. This grain size was similar to the grain size and morphology of the bulk vanadium membrane tube, and the tube prior to welding/braising. FIG. 7(b) shows a comparative example of a sample that is joined without using the chill block. The average grain size was determined to be 62 microns. This grain size was larger to the grain size and morphology of the bulk vanadium membrane tube, and the tube prior to welding/braising, indicating a heat effected zone resulted from the joining process without the use of a chill block.

Figure 7:
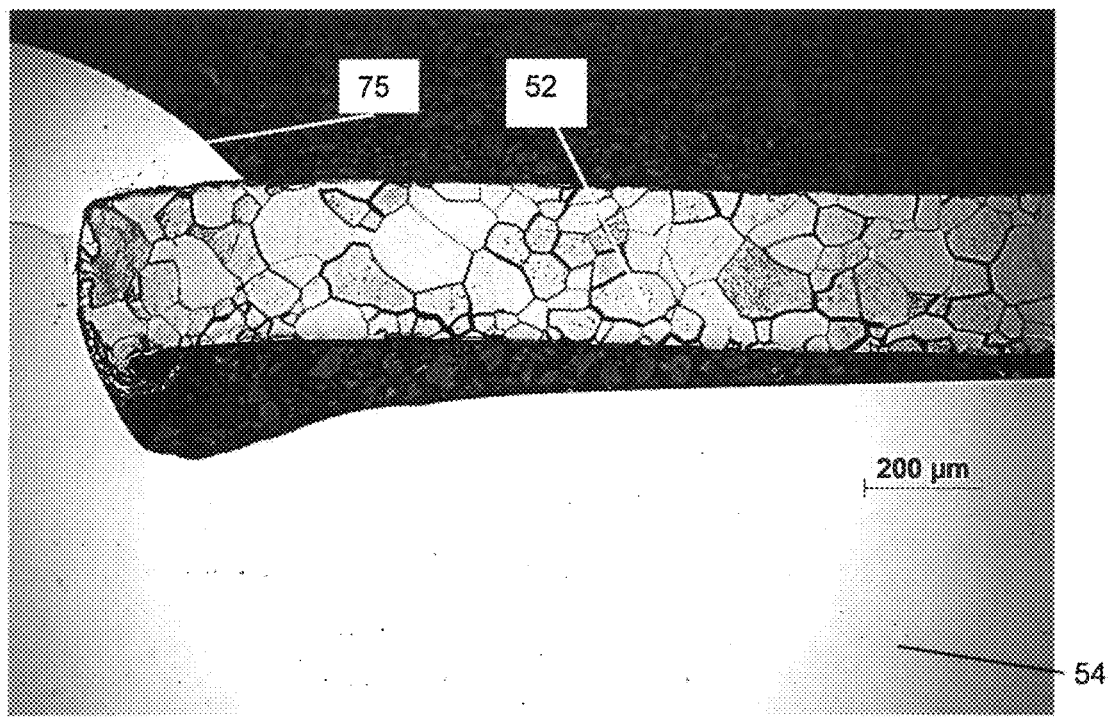
FIG. 7 provides optical micrograph images of two samples which show the effect of the chill block on the grain size, (a) a sample joined using a method according to the present invention utilising a chiller block; (b) a comparative sample joined without using a chiller block and (c) comparative sample showing the grain structure of the vanadium tube sample prior to laser joining/welding.
Figure 7:
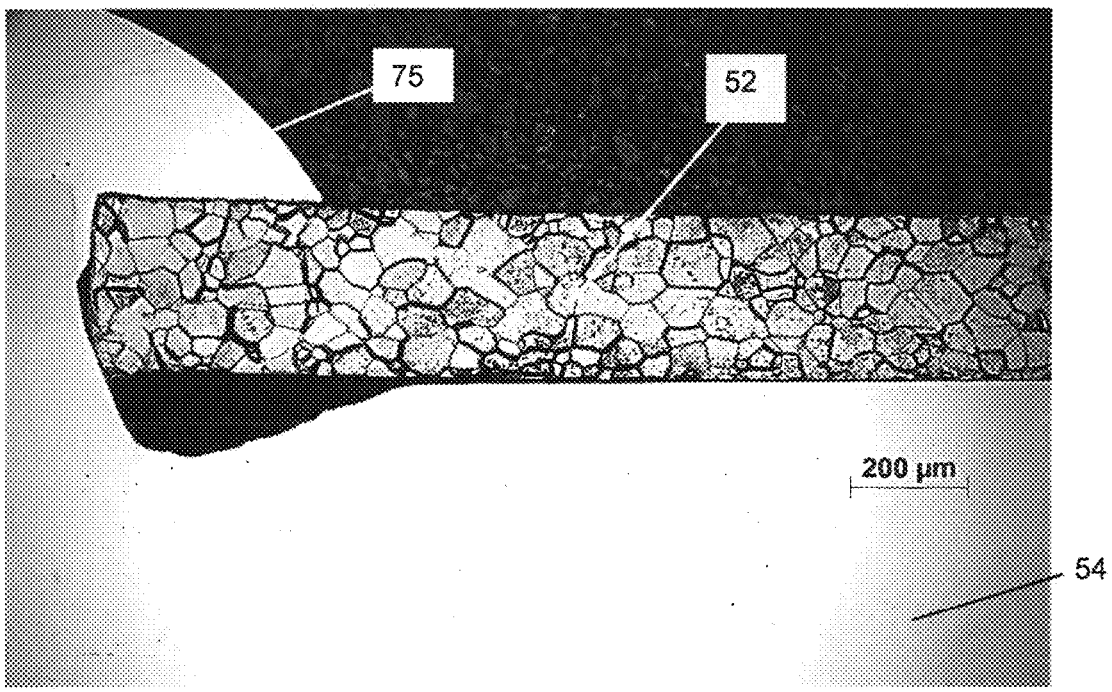
Figure 7:
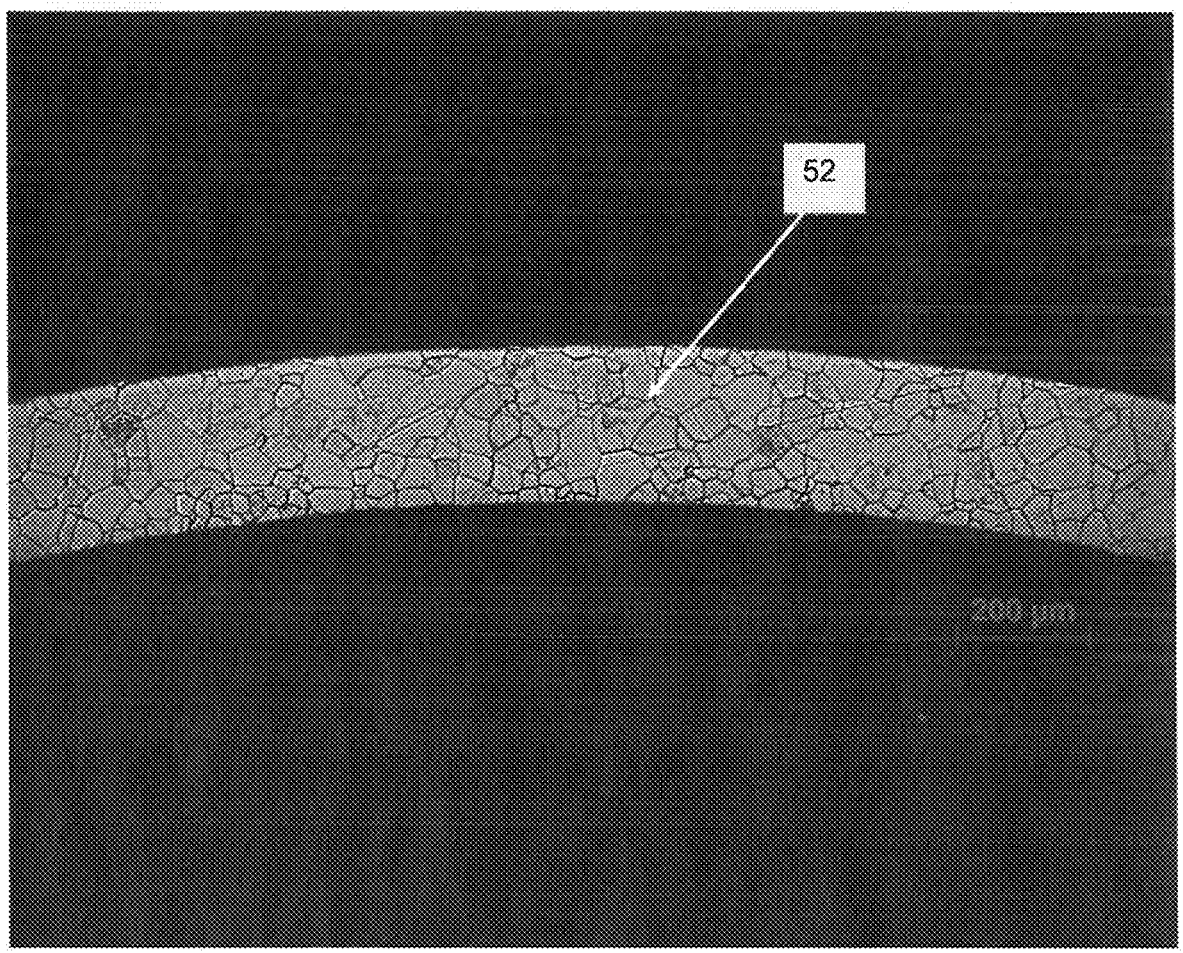
Figure 8:
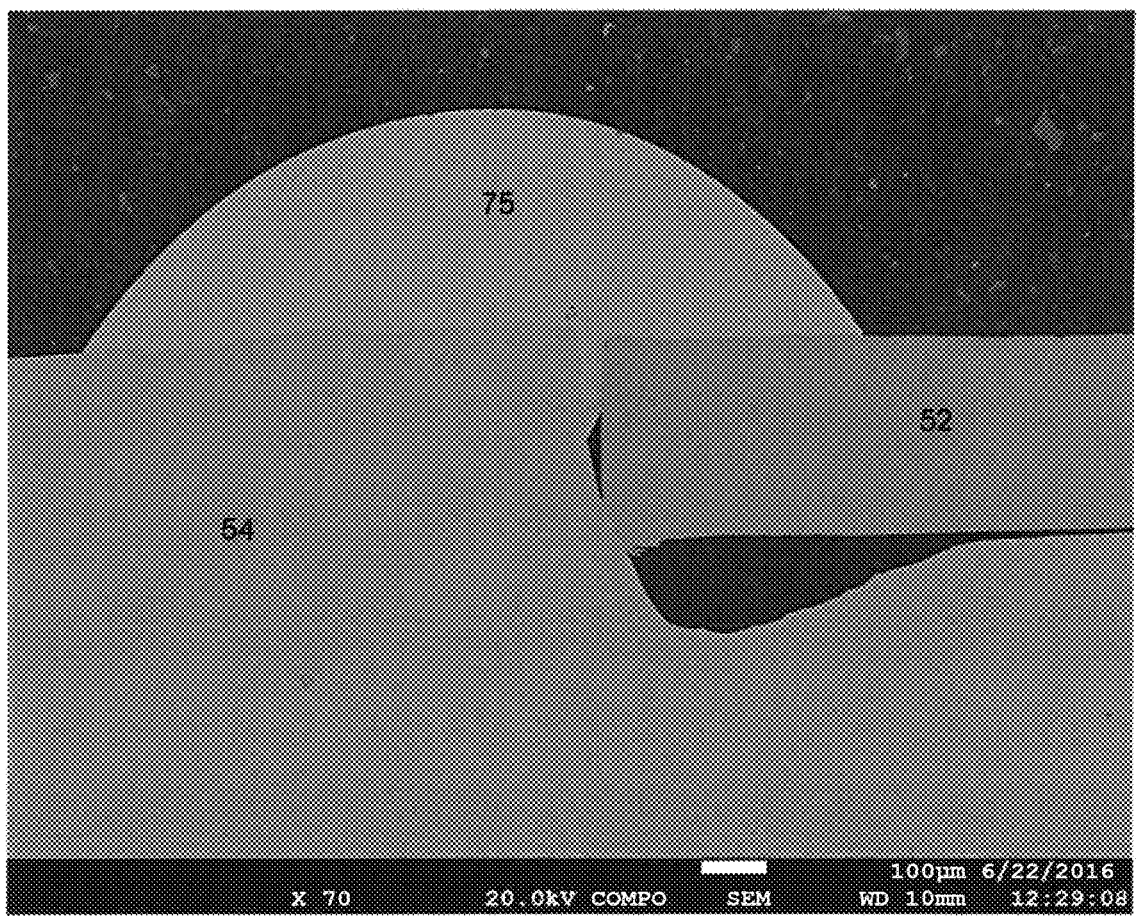
FIGS. 8 and 9 provides a series of SEM images which show the interface between the vanadium membrane and the brazing alloy of the sample shown in FIG. 7(*a*).
Figure 9:
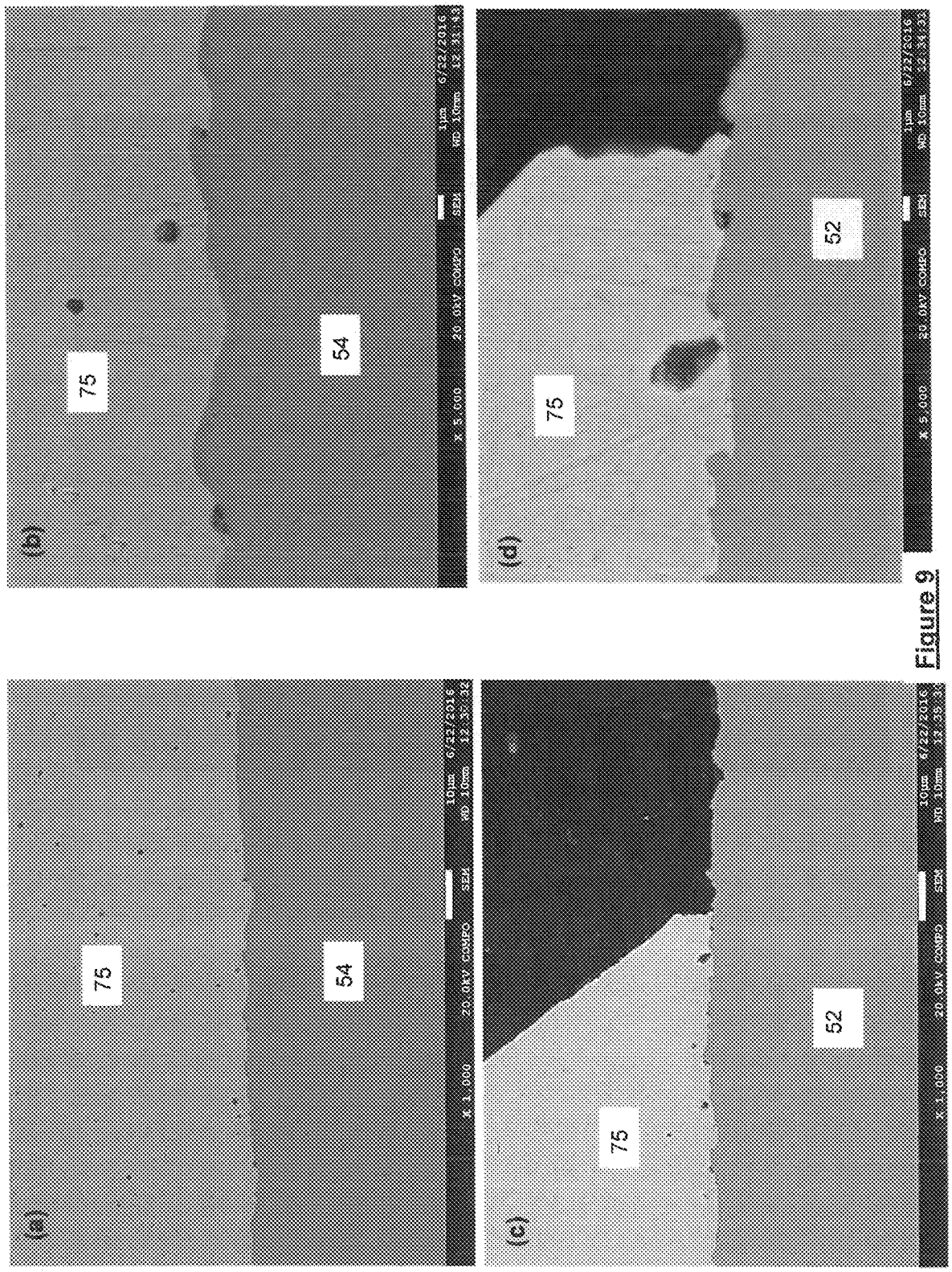

FIGS. 8 and 9 provides a series of SEM images which show the interface between the vanadium membrane tube 52 and the bridging section 75 of filler metal 70 (i.e. brazing alloy) of the sample shown in FIG. 7(*a*). These are backscattered electron images which can reveal compositional variations. As each of the images in FIGS. 8 and 9 shows, the interface is sharp which means there is no dilution of the vanadium by the brazing alloy.

Example 3—Temperature Effect of Use of a Chiller/Chill Block

Figure 10A:
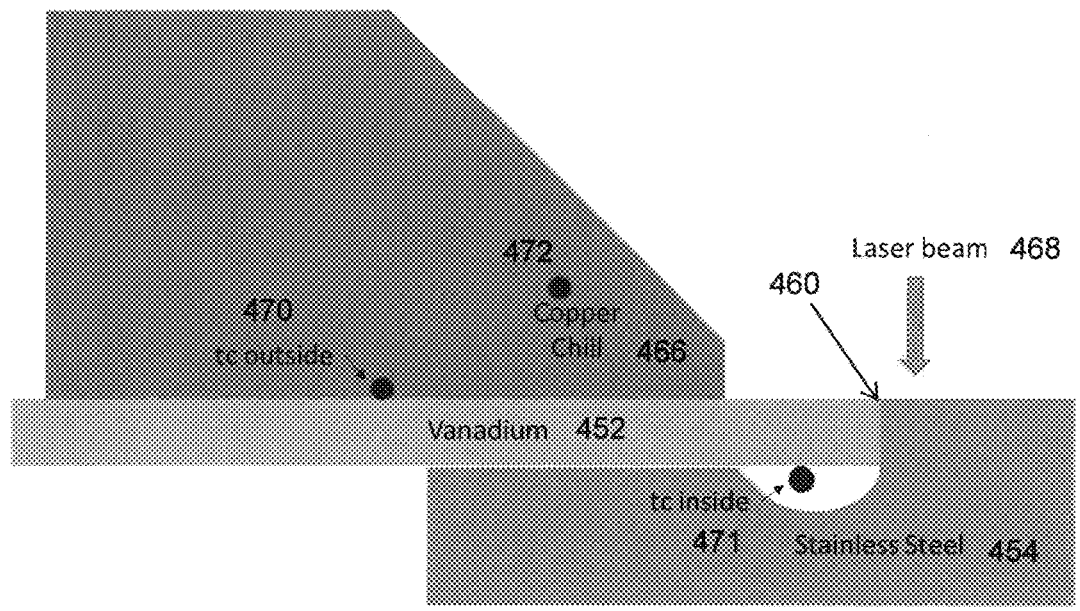
FIG. 10A provides a schematic illustration of a laser brazing experimental setup according to embodiments of the present invention.
Figure 10B:
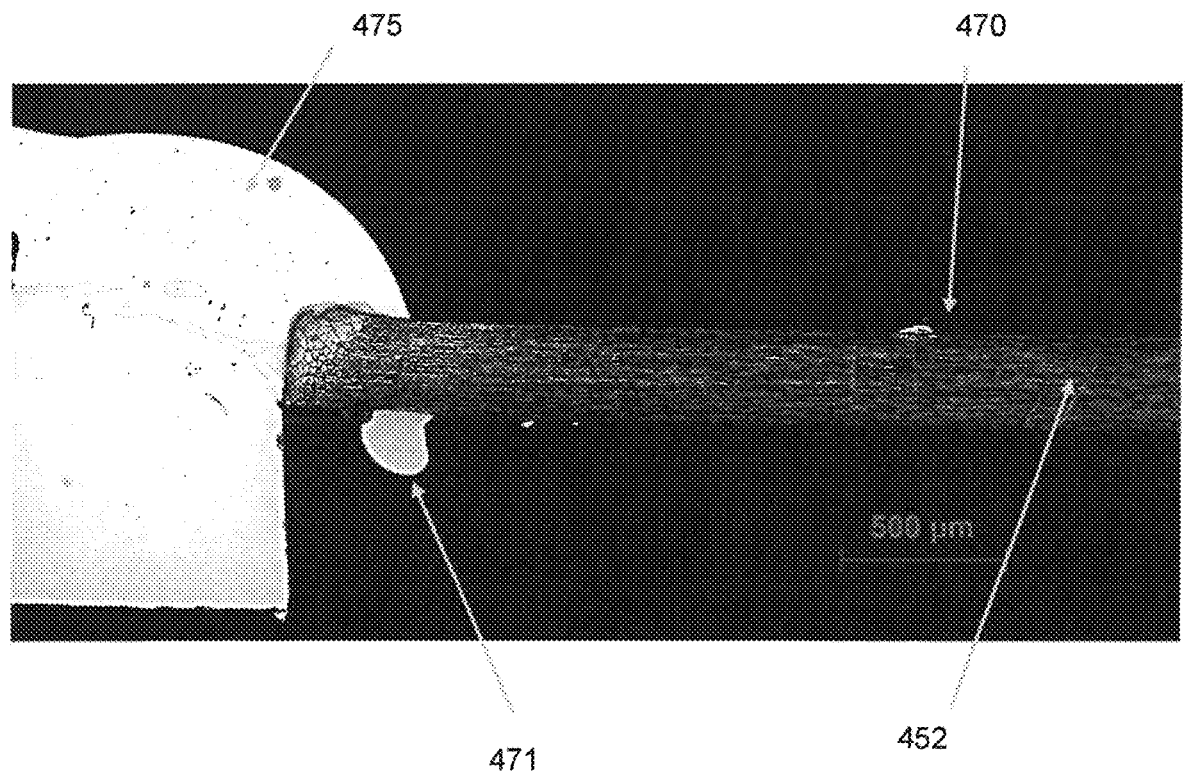
FIG. 10B provides a schematic illustration of a comparative laser brazing experimental setup without use of a chiller.

The temperature effects of the laser brazing technique of the present invention were investigated for joining a vanadium-aluminium alloy tube to a stainless steel mounting tube. A schematic illustration of the overall experimental set up is provided in FIG. 10. It should be noted that the general experimental set up is the same as illustrated in FIG. 1 as described above for Example 1 with the addition of temperature sensors (thermocouples) as described below.

In these experiments, the copper chill block 466 weighed 53 g and was 30 mm long. The vanadium tube 452 can vary in length, but in this experiment weighed 0.042 g/mm. Therefore, the weight of vanadium (of the vanadium tube 452) covered by the copper chill block 466 was 1.26 g. The stainless steel connection section 454 that the vanadium tube 452 was welded onto weighed 4.5 g.

Temperature data was collected during the laser braising process using two fine thermocouple wires 471 (TC inside on FIG. 10—labelled inside tc1 and inside tc2 on the plots shown in FIGS. 11A to 12B) which were spot welded to the inside of the vanadium tube 452, 0.3 mm from the end and 180 degrees apart. A thermocouple 470 (TC outside on FIG. 10—labelled outside tc on the plots shown in FIGS. 11A to 12B) was also attached to the outside of the vanadium tube 452, 2 mm from the end. A thermocouple 472 (chill on the plots shown in FIGS. 11A to 12B) was also at welded to the copper chill block 466, on a split face thereof, approx. 1 mm from front and 1 mm from the connection interface 460.

For a first experimental sequence comprising two runs (see FIGS. 11A and 11B), a copper chill block (466, FIG. 10A) was located in thermal contact with the vanadium membrane tube 452, proximate the connection interface 460 between the vanadium membrane tube 452 and the connection section 454. For a second experimental sequence comprising two runs (see FIGS. 12A and 12B and experimental set up in FIG. 10B), the copper chiller block 466 was not used during the laser brazing procedure in this experimental sequence. The second experimental sequence provided comparative results by which the temperature effects of the chiller on cooling the vanadium membrane tube 452 could be determined.

Figure 11A:
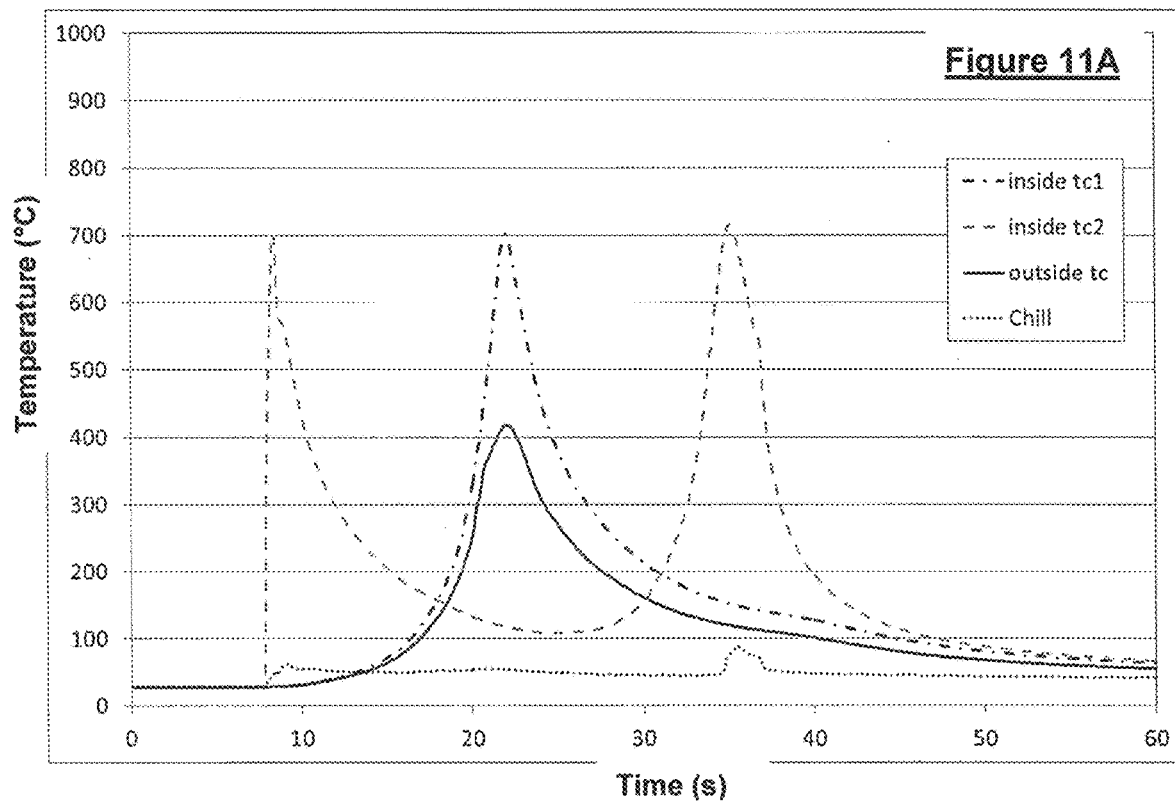
FIGS. 11A and 11B provide a temperature vs time plot of two separate laser brazing runs conducted using the experimental laser brazing arrangement shown in FIG. 10, utilising the chiller.
Figure 11B:
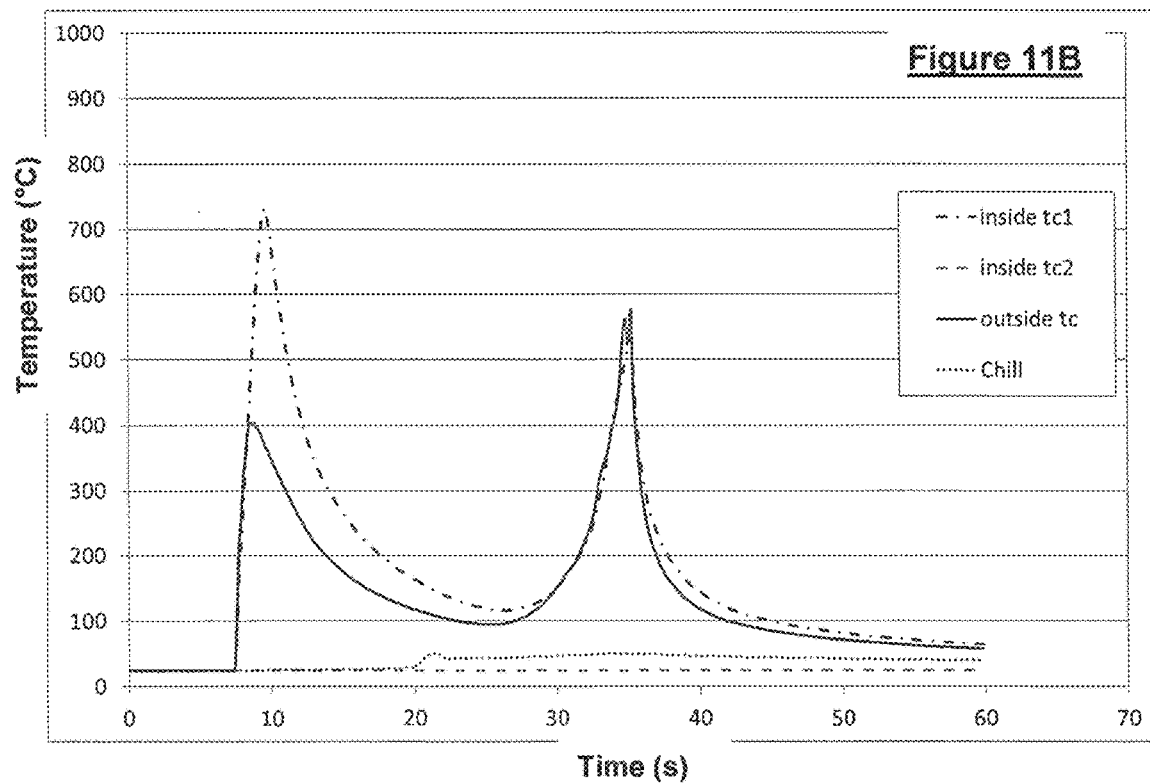

The results of the trials are presented in FIGS. 11A to 12B, which show the first "chilled" experimental sequence in FIGS. 11A and 11B; and the second "no chill" experimental sequence in FIGS. 12A and 12B. It should be noted that:
the cold junction between the copper chill block 466 and vanadium membrane tube 452 was erratic, and an applied offset was fixed for each run by the value measured at the start. The inventors consider that any error in the readings would be limited to 2 or 3 degrees.
The position of inside tc1 was swapped between the repeated runs.

With the copper chill block 466 (FIGS. 11A and 11B):
run 1 (FIG. 11A) inside tc1 was 180 degrees from the start of the weld; inside tc2 was 180 apart from inside tc1;
run 2 (FIG. 11B) tc1 was at the start of the weld inside tc2 was 180 apart from inside tc1. The data from inside tc2 appears to have not recorded accurately for this run.

Without the copper chill block 466:
run 1 (FIG. 12A) inside tc1 was at the start of the weld inside; inside tc2 was 180 apart from tc1;
run 2 (FIG. 12B) tc1 was 180 degrees from the start of the weld; inside tc2 was 180 apart from inside tc1.

The inventors note that both the chill tc and the outside tc data (shown in FIGS. 11A to 12B) likely shows some bias due to direct heating by scattered radiation. This can be attributed to reflection from the laser itself plus radiation from the molten/hot bead. However, the general trend provided by the collected data is indicative to the temperature effects at those points.

As shown in FIGS. 12A and 12B, the peak temperature of each of the recorded points on the reached in the vanadium membrane tube 452 during welding without the use of the copper chill block 466 was 919° C. In comparison, the peak temperature of each of the recorded points on the reached in the vanadium membrane tube 452 during welding using cooling from the copper chill block 466 was 733° C. The copper chill block temperature increased from an ambient of 23 to 35° C.

The recrystallisation temperature of vanadium is between 800 to 1010° C. The copper chill block 466 therefore has had the effect of bringing the peak temperature of the vanadium membrane tube 452 to below the recrystallization temperature. The microstructure and grain morphology is therefore not affected by a recrystallization process during welding when the copper chill block 466 is used.

Applications

The primary application is as a coating for vanadium alloy tubes used as high-temperature, hydrogen-selective alloy membranes. These devices separate hydrogen from mixed gas streams which can also contain $H_2O$, $CO$, $CO_2$, $CH_4$ and $H_2S$. One particular application is use of hydrogen-selective alloy membranes for the production of $H_2$ and capture of $CO_2$ from gasified coal and biomass.

Other possible applications include a medium for storing high purity hydrogen gas for use in fuel cells for mobile or distributed electricity generation, the shielding of ionising radiation for aerospace applications, and as a thermal energy storage medium.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:
1. A method of joining and sealing a vanadium based membrane to a metallic connection section comprising:
mounting a section of a vanadium based membrane on a connector formation of a connection section, the con- nection section being formed of a different metal to the vanadium based membrane, the connector formation providing a recess into which a section of the vanadium based membrane is seated and a connection interface in which the end face of the vanadium based membrane is proximate to or substantially abuts an adjoining face of the connector formation;

mounting and operating a chiller arrangement in thermal contact with the vanadium based membrane proximate the connection interface;

heating a filler metal on the connection section in a brazing process so as to form a bridging section of filler metal between the vanadium based membrane and the connection section over the connection interface, without melting the connection section and the vanadium based membrane, the filler metal being selected from at least one of aluminum-silicon, copper, copper alloy, gold-silver alloy, nickel alloy or silver and the filler metal being heated to at least the liquidus temperature of the filler metal using a laser beam directed onto the filler metal located on the connection section and having a beam edge positioned at an offset location spaced apart from the connection interface at a distance so as to attenuate direct heating of the vanadium based membrane by the laser beam during the brazing process, and on the connection section, such that the filler metal can flow over the connection interface from the offset location onto the un-melted vanadium based membrane, the chiller arrangement operating during the brazing process to cool the vanadium based membrane; and cooling the filler metal to form the bridging section of filler metal between the un-melted vanadium based membrane and the un-melted connection section over the connection interface, and wherein use of the chiller arrangement together with the beam edge being positioned at an offset location spaced apart from the connection interface permits the un-melted vanadium based membrane to have an average grain size proximate to the bridging section that is substantially the same as the average grain size of the vanadium based membrane.

2. A method according to claim 1, wherein the beam edge is spaced apart at least 0.1 mm offset from the connection interface.

3. A method according to claim 1, wherein:
the connection section is comprised of at least one of: steel, stainless steel, nickel-chromium-iron alloys or a combination thereof; the filler metal comprises at least one of aluminum-silicon, copper, copper alloy, gold-silver alloy, nickel alloy or silver; and
the vanadium based membrane comprises a vanadium alloy comprising: vanadium; aluminum having a content of greater than 0 to 10 at %; and Ta content of less than 0.01 at %, having a ductility of greater than 10% elongation.

4. A method according to claim 1, wherein:
the vanadium based membrane has a thickness of from 0.1 to 1 mm; and
the connection section has a thickness of from 1 to 5 mm.

5. A method according to claim 1, wherein the laser beam heats the filler metal to a temperature of the liquidus temperature of the filler metal plus at least 5° C.

6. A method according to claim 1, wherein the laser beam has a beam width of between 0.4 and 1.5 mm.

7. A method according to claim 1, wherein the ratio of the distance of the offset location spaced apart from the connection interface to a beam width is from 0.1 to 0.5.

8. A method according to claim 1, wherein the chiller arrangement comprises a conductive body in contact with an outside section of the vanadium based membrane proximate the connection interface.

9. A method according to claim 1, wherein the chiller arrangement prevents the vanadium based membrane from reaching a peak temperature of no greater than 800° C.

10. A method according to claim 1, wherein the step of cooling the filler metal comprises allowing the filler metal to cool via convective cooling and/or conductive cooling through operative association with the chiller arrangement.

11. A method according to claim 1, wherein the bridging section of filler metal comprises a body having a center at the offset location and extending over the connection interface by at least 0.3 mm.

12. A laser brazing arrangement for joining and sealing a vanadium based membrane to a metallic connection section comprising:
a vanadium based membrane mounted on a connector formation of a connection section, the connection section being formed of a different metal to the vanadium based membrane, the connector formation providing a recess into which a section of the vanadium based membrane is seated and a connection interface in which the end face of the vanadium based membrane is proximate to or substantially abuts an adjoining face of the connector formation;
a laser welding arrangement including a laser beam which in use is directed at the connection section and has a beam edge positioned on the connection section, at an offset location spaced apart from the connection interface at a distance that attenuates direct heating of the vanadium based membrane by the laser beam;
a filler metal feeder configured to feed a filler metal selected from at least one of aluminum-silicon, copper, copper alloy, gold-silver alloy, nickel alloy or silver and the filler metal feeder feeds the filler metal under the laser beam at the offset location on the connection section such that in use the filler metal is melted by the laser beam in a brazing process, without melting the connection section and the vanadium based membrane, such that the filler metal can flow over the connection interface from the offset location onto the un-melted vanadium based membrane; and
a chiller arrangement in thermal contact with vanadium based membrane proximate the connection interface configured to cool the vanadium based membrane during operation of the laser welding arrangement in the brazing process,
wherein the chiller arrangement is configured to cool the filler metal during the brazing process to form a bridging section of filler metal between the un-melted vanadium based membrane and the un-melted connection section over the connection interface, wherein operation of the chiller arrangement together with the beam edge being positioned at an offset location spaced apart from the connection interface is configured to permit the un-melted vanadium based membrane to have an average grain size proximate to the bridging section that is substantially the same as the average grain size of the vanadium based membrane.

\* \* \* \* \*